United States Patent [19]

Andersson et al.

[11] Patent Number: 5,530,917
[45] Date of Patent: Jun. 25, 1996

[54] METHOD AND A DEVICE FOR THE UTILIZATION OF CHANNELS IN A RADIO COMMUNICATIONS SYSTEM

[75] Inventors: Claes H. Andersson, Ekerö ; Knut M. Almgren, Sollentuna; Kenneth Y. Wallstedt, Solna; Anna Fallgren; Håkan Eriksson, both of Danderyd, all of Sweden

[73] Assignee: Telefonaktiebolaget LM Ericsson, Stockholm, Sweden

[21] Appl. No.: 245,031

[22] Filed: May 17, 1994

[30] Foreign Application Priority Data

May 17, 1993 [SE] Sweden ................... 9301695

[51] Int. Cl.⁶ .................. H04B 1/00; H04B 7/00
[52] U.S. Cl. ............ 455/54.1; 455/33.2; 455/34.1
[58] Field of Search .................. 455/33.2, 34.1, 455/34.2, 54.1, 54.2, 56.1, 62, 62.1

[56] References Cited

U.S. PATENT DOCUMENTS

| | | | |
|---|---|---|---|
| 5,157,709 | 10/1992 | Ohteru | 455/56.1 |
| 5,241,685 | 8/1993 | Bodin et al. | 455/56.1 |
| 5,285,447 | 2/1994 | Hulsebosch | 455/56.1 |
| 5,361,402 | 11/1994 | Grube et al. | 455/54.1 |

FOREIGN PATENT DOCUMENTS

| | | |
|---|---|---|
| 419205 | 3/1991 | European Pat. Off. . |
| 490554 | 6/1992 | European Pat. Off. . |

OTHER PUBLICATIONS

Panzer et al., "Adaptive Resource Allocation in Metropolitan Area Cellular Mobile Radio Systems" 40th IEEE Vehicular Technology Conference, pp. 638–645 (May 6–9, 1990).

Fujii et al., "Reduction of Cochannel Interference in Cellular Systems by Intra–Zone Channel Reassignment and Adaptive Transmitter Power Control", IEEE, pp. 668–672 (1988).

D. Åkerberg, "Novel Radio Access Principles Useful for Third Generation Mobile Radio Systems," Third IEEE Int'l Symposium on Personal, Indoor and Mobile Radio Communications, pp. 1–10 (Oct. 19–21, 1992).

M. Almgren et al., "Capacity Enhancements in a TDMA System" Ericsson Radio Systems AB, pp. 1–4 (Apr. 1993).

CME 20 Advanced System Technique, pp. 95–96, Doc. No. EN/LZT 120 264 R3A, Ericsson Radio Systems AB (1991).

Primary Examiner—Reinhard J. Eisenzopf
Assistant Examiner—Marsha D. Banks-Harold
Attorney, Agent, or Firm—Burns, Doane, Swecker & Mathis

[57] ABSTRACT

A method for optimizing the use of channels, the changing of channels and handover procedures in a mobile telecommunications system for instance, wherein parameters belonging to the mobile telecommunications system generate the load values for the connections via different channels/base stations between subscribers in a public telephone network and mobile stations in the mobile telecommunications systems. Different kinds of parameters can be compared directly by means of the load values which are combined to provide a total load value for each connection. A first total load value is generated for a connection set-up between one of the subscribers and one of the mobile stations. The total load values for the connection are estimated for alternative channels/base stations and these total load values are compared with the first total load value. The system changes to the channel/base station that has the most favorable load value, on the basis of the comparison. The load values can also be used to optimize the resources within one or more base stations, so that the sum of the load values for the connections within one or more base stations will become the most advantageous.

49 Claims, 12 Drawing Sheets

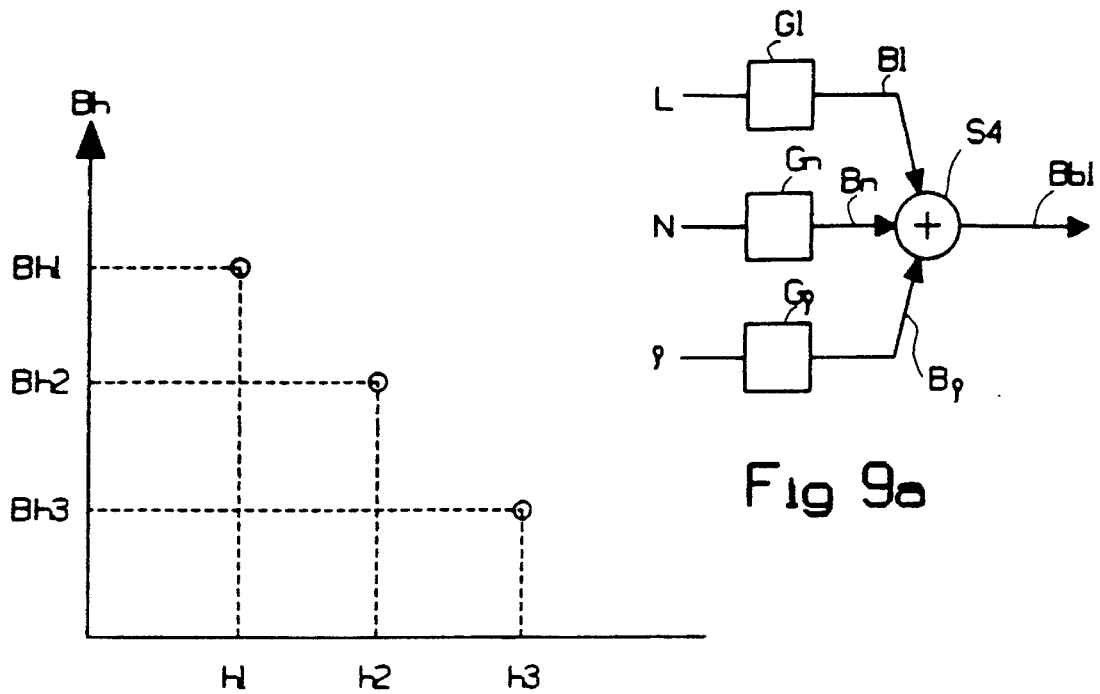
Fig 8
Fig 9a
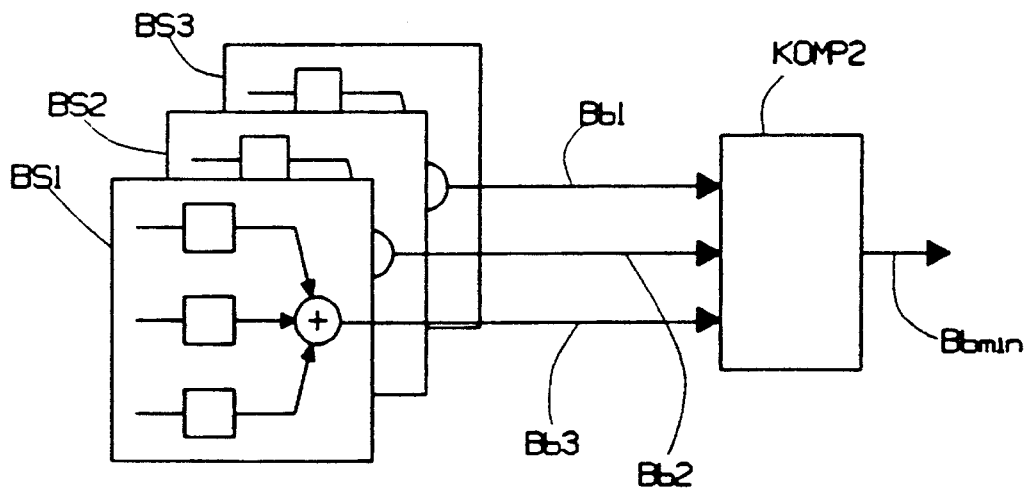
Fig 10

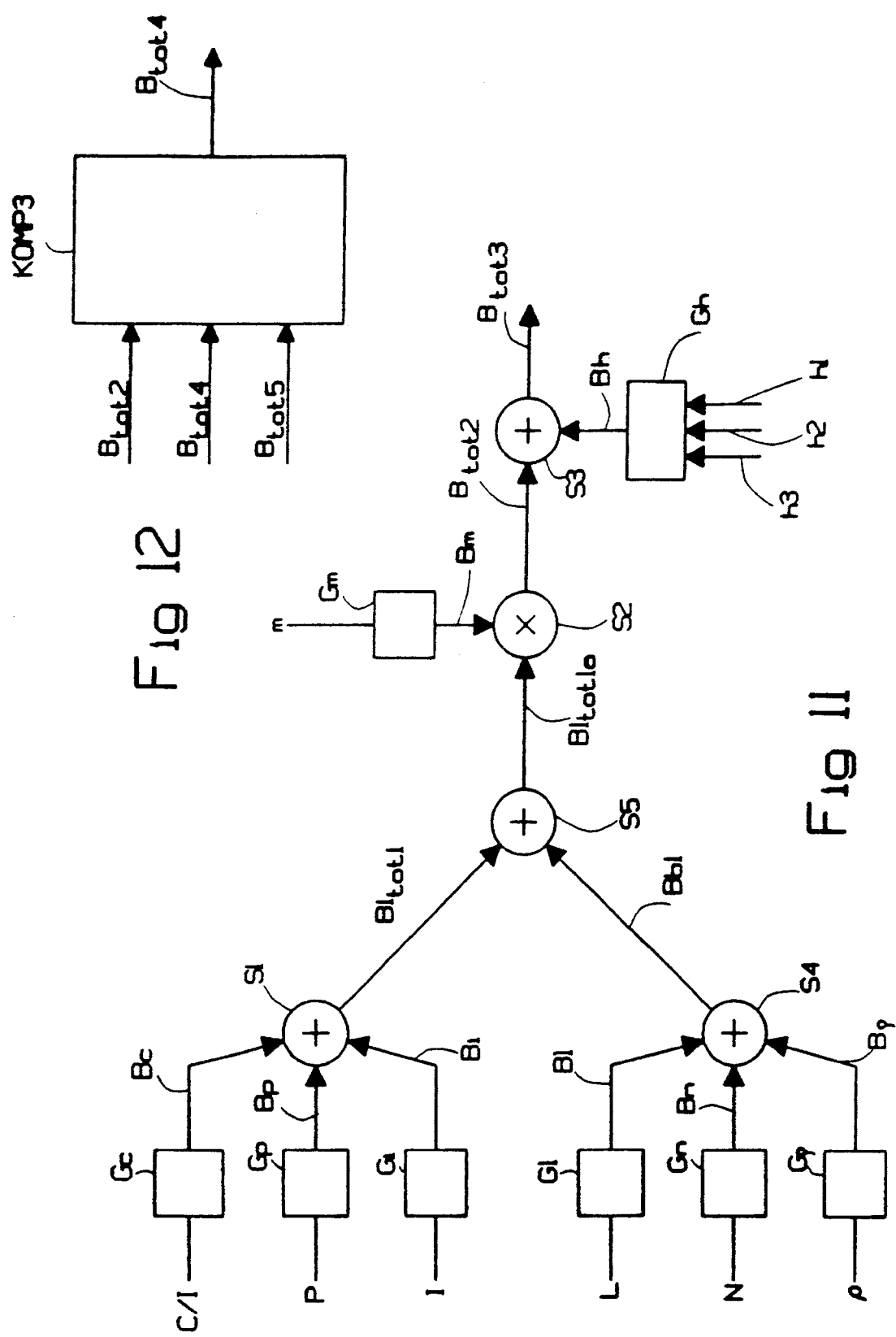

METHOD AND A DEVICE FOR THE UTILIZATION OF CHANNELS IN A RADIO COMMUNICATIONS SYSTEM

BACKGROUND

The present invention relates to a method for setting-up a connection in a radio communications system which includes at least one first radio station having at least one transmitter/receiver, wherein the radio communications system has access to channels that are intended for connections between at least one first subscriber and at least one further radio station, and wherein the properties of the connections are contingent on system parameters. The invention also relates to handover procedures, optimization of channel utilization and channel changes, and also relates to an arrangement for carrying out these methods and procedures.

When setting-up connections between two subscribers in a mobile telephone system for instance, two-directional connections are established between mobile stations and base stations. Each connection includes two channels, of which one is used for communication from one of the mobile stations to one of the base stations, and the other channel is used for communication in the opposite direction. It can be established whether or not the properties of a connection are sufficiently good for two-directional communication, by measuring parameters which reflect the properties of the connection.

One method of determining the properties of a connection between a base station and a mobile station is to calculate the C/I-value of the connection. This can be effected both in the uplink, i.e. the connection from the mobile station to the base station, and in the downlink, i.e. the connection from the base station to the mobile station. In the case of the uplink, the C/I-value is the quotient between the signal strength C of a mobile station detected by a receiving base station and the sum of the signal strengths of interfering mobile stations in the local cell or in neighbouring cells detected by said base station. Thus, the C/I-value is a measurement which is used as a parameter in determining whether or not the properties of a connection are sufficiently good.

A channel can be allocated a connection in a known manner when the channel fulfills a predetermined criterion. In this regard, one method of channel allocation is to estimate the C/I-value of all channels, by assuming a given transmission power, among other things. The criterion for channel allocation is to allocate the channel that has the highest C/I-value. One drawback with this method is that the channel is not allocated on the basis of the actual need of the mobile, and instead the mobile is allocated the best channel, meaning that resources are not optimized. This problem is considered in "The Third IEEE International Symposium on Personal, Indoor and Mobile Radio Communications", Oct. 19–21, 1992, Boston, Mass., U.S.A. in the conference report "Novel Radio Access Principles Useful for Third Generation Mobile Radio Systems" by Dag Åkerberg, Ericsson Radio Systems AB.

Another criterion is that the C/I-value shall exceed a given threshold value and that the channel allocated is one which just exceeds the threshold value. This is illustrated in the IEEE article "Reduction of Cochannel Interference in Cellular Systems by Intra-Zone Channel Reassignment and Adaptive Transmitter Power Control" by Teruya Fuji and Masayuki Sakamoto, NTT, Japan.

The European Patent Application EP 0,419,205 teaches a channel allocation method for application in a mobile telephone system which includes mobile stations and base stations. A speed detector measures the speed of the mobile stations and a signal generator generates a speed dependent value. A channel which exhibits quality properties that agree with the value generated by the signal generator is allocated to respective mobile stations. Channel selection is thus influenced by the speed at which the mobile stations move.

All of the aforedescribed methods have the common drawback of solely taking one or a few parameters into account when assessing a connection. The algorithms required to fulfil the set criteria are also complicated and, in many instances, difficult to perform.

A general problem related to mobile telephone systems is that the allocation of two-directional connections between base stations and mobiles is effected without selecting channels in an adequate manner. When selecting channels, attention is paid only to a few parameters, for instance only to the C/I-value, when deciding whether or not the connection is satisfactory. This has resulted in the system allocation of a channel which has good quality properties for a connection without taking into account the consequences of this allocation, for instance consequences in the form of interference on other connections or of uneven distribution of the radio resources between different base stations. Consequently, the mobile telephone system has not been optimized with respect, for instance, to radio resources and interference that is liable to affect other connections. Examples of radio communications systems in which the aforesaid problems occur are mobile telephone systems which use frequency division multiple access (FDMA), time division multiple access (TDMA), coding (CDMA) and so-called DECT-systems.

SUMMARY

The present invention solves the aforesaid problems, by generating the load values of individual connections. These load values are scalar measurements and can be compared directly with one another when assessing a connection.

An object of the present invention is to produce between radio stations in a radio communications system two-directional connections which have sufficiently good properties in both the uplinks and the downlinks and, at the same time, to introduce the least possible interference to other connections. This object is achieved by first registering a set of connection associated parameters, each of which generates a connection load value. The load values that have been generated by the various parameters are then combined to form a total connection load value. The parameters that are combined may be parameters which describe the properties of the radio channels, for instance the C/I-value, the power output P of the radio stations, the interference I, or parameters which disclose the performance of the radio station.

It is possible to determine on the basis of the total load value of a connection whether or not the connection is satisfactory and shall therefore remain unchanged, or whether the total load value of the connection should be changed so that the total load on the system will not become too high, for instance as a result of unacceptable interference on other connections. The system can optimize the load value of each connection, by regularly checking the prevailing or current load value of the connection and comparing this current load with the estimated load values, which are an estimation of the load value when solely alternative load values are used or when alternative parameter sets which include alternative parameter values are used. The estimated load values are compared with the current load value of the connection and the system chooses the set of parameters and the parameter values which will give the connection the smallest load value at that particular time. In the case of a mobile telephone system, a first procedure taken with the intention of reducing the load value of a connection may be to estimate the load value of different power states and to change to the power state which will give the lowest load value at that time. If the load value is not reduced sufficiently, a further procedure may be one of allocating the connection another channel, and if this channel change is not sufficient to reduce the load value of a connection, a third procedure that may be adopted is to change the base station for the connection concerned.

Another object of the invention is to utilize the resources of the base station optimally, for instance in a mobile telephone system. Since a base station only has access to a limited number of transmitters/receivers or channels, it is uneconomical to utilize a last transmitter/receiver or channel for a base station when a neighbouring base station has free available resources. The resources of a base station can be optimized when switching to a channel which has a lower load value for a connection within a base station. The system accomplishes the optimal use of resources by considering parameters other than the aforementioned parameters that generate a connection load value. An example of such parameters include attenuation of signal strength between base station and mobile station, the number of transmitters/receivers or channels used for a base station (i.e. traffic seizure), the number of transmitters/receivers or channels available to a base station, or the change of channels.

Another object of the invention is to optimize the resources within the mobile telephone system. The system combines the parameters which generate the connection load values also in this case, but now also takes further parameters into account, for instance the change of base station, the remaining radio resources of a base station compared with neighbouring base stations, and generates a total load value on which the selection of power state, channel and base station can be based. The sum of the load values of the connections in the system can also be optimized. For instance, the system can change base station between two mobile stations whose respective connections are established between two different base stations, when the load value of the two connections decreases after the change.

A load value for a given connection is updated at regular intervals, i.e. the system measures the parameters regularly and generates the load value for the connection.

The invention will now be described in more detail with reference to preferred exemplifying embodiments thereof and also with reference to the accompanying drawings.

BRIEF DESCRIPTION OF THE DRAWINGS

FIG. 5a is a diagram which illustrates the load value of a connection as a function of the priority level of different channels.

FIG. 5b is a list showing priority levels and the load values of the channels from FIG. 5a.

FIG. 8 is a diagram which illustrates the influence of different procedures on a connection load value.

FIG. 9a is a block schematic which illustrates three load generators and a combining circuit.

FIG. 10 is a block schematic which includes load generators from FIG. 9a and a comparator for the selection of load values.

FIG. 11 is a block schematic illustrating a combining circuit which includes the load generators from FIG. 7a and FIG. 9a.

FIG. 12 is a block schematic which illustrates a comparator for selecting the generated load values from FIG. 11.

DETAILED DESCRIPTION

Figure 1A:
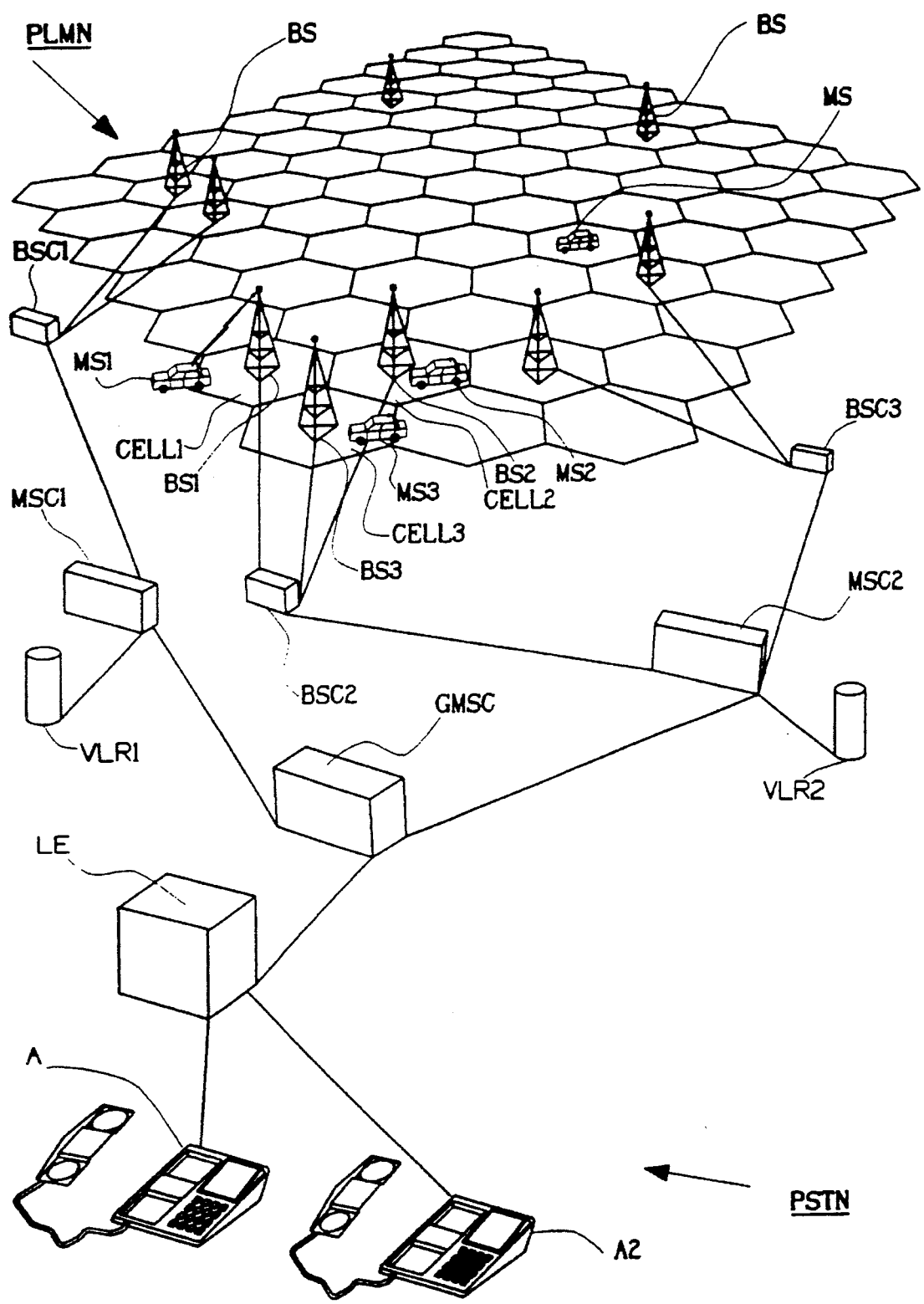
FIG. 1a is a perspective view of a cellular mobile telephone system comprising base stations and mobile stations.

FIG. 1a illustrates a public land mobile network or mobile telephone system PLMN which includes a plurality of base stations BS and mobile stations MS. A subscriber A in a public switched telephone network PSTN sets-up a connection with, for instance, the mobile station MS1, via a local exchange LE, a gateway mobile services switching centre GMSC, one of the mobile services switching centres MSC1, MSC2, one of the base station controllers BSC1, BSC2, BSC3 and finally through one of the base stations BS controlled by the base station controllers BSC1, BSC2, BSC3. The two-directional connection thus also includes the radio connection between one of the base stations, for instance the base station BS1, and the mobile station MS1, this connection being established by allocating suitable communication channels to the radio connection. FIG. 1a also shows a further subscriber A2.

Figure 1B:
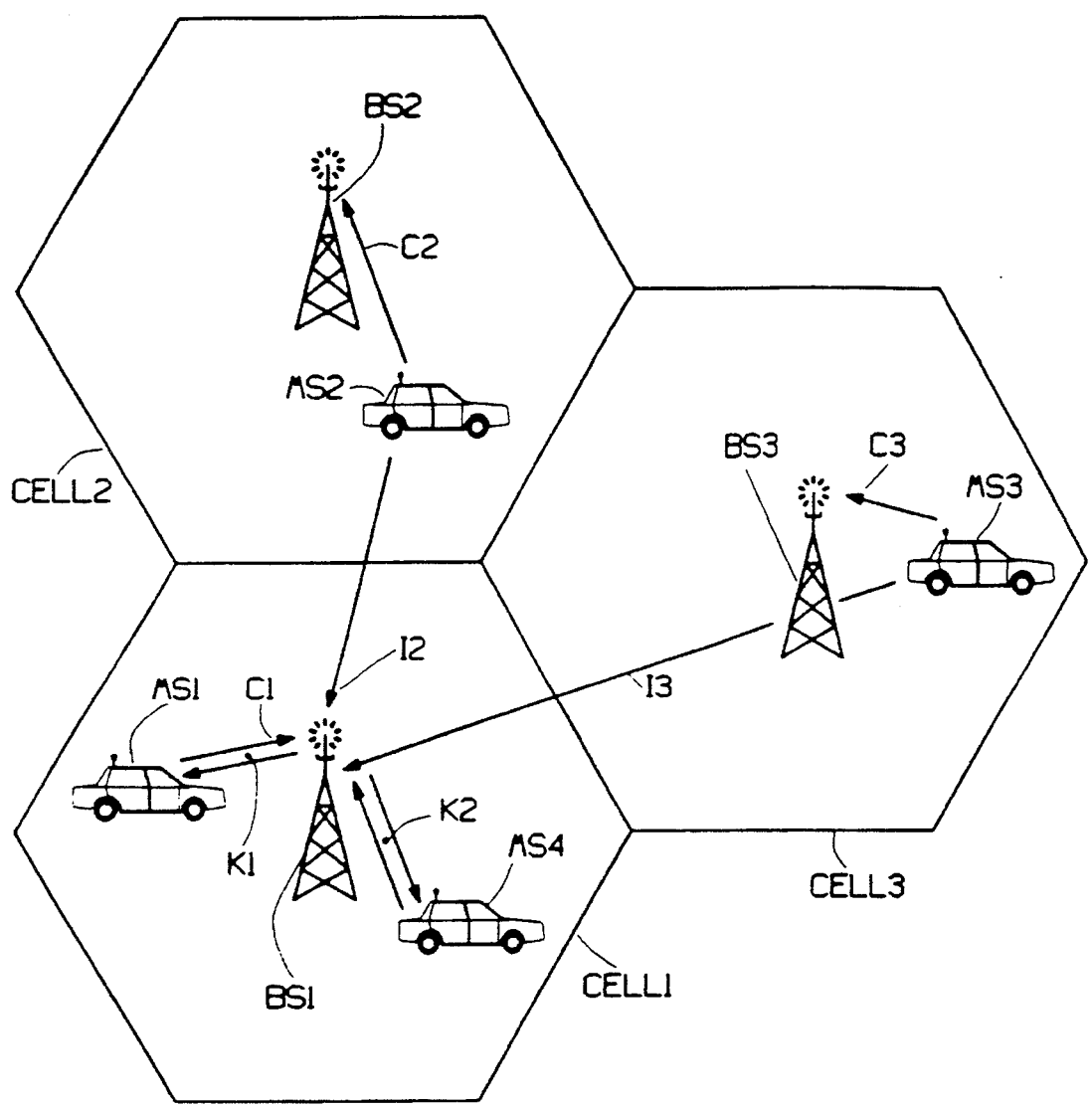
FIG. 1b illustrates from above cells having four mobile stations and three base stations in the mobile telephone system illustrated in FIG. 1a, and also illustrates a typical traffic situation.

FIG. 1b illustrates in more detail the mobile station MS1 which communicates via the base station BS1 in a first cell CELL1. The mobile stations MS2 and MS3 which communicate with respective base stations BS2 and BS3 are located in neighbouring cells CELL2 and CELL3. The communication between a base station and a mobile station is two-directional and forms part of a connection set-up. Each connection set-up uses two frequencies, of which one frequency is used for communication from the mobile station to the base station, the so-called uplink, while the other frequency is used for communication from the base station to the mobile station, the so-called downlink.

The traditional analogue FDMA systems require a unique frequency for each connection. In the case of an FDMA system, a radio channel can therefore in principle be considered as one frequency. In the case of a GSM type TDMA system, each connection requires a unique time slot on one frequency. In the case of a GSM-system, a radio channel can therefore be considered as a time slot on one frequency. On the other hand, a TDMA system according to American standard TIA IS-54B requires two time slots on one frequency for each full rate connection. In the case of a TDMA system of this kind, it can thus be said that a so-called full rate radio channel is, in principle, two time slots on one frequency.

In traditional FDMA systems and TDMA systems according to GSM and TIA, the connections are two-directional and different uplink and downlink frequencies are used. In TDMA systems according to the new European DECT standard, the connections are also two-directional although in this case the same frequency is used for both uplink and downlink.

The mobiles MS1, MS2 and MS3 send all information to respective base stations BS1, BS2 and BS3 at respective signal strengths C1, C2 and C3. These signals transmitted from the mobiles form, at the same time, interference signals on the remaining base stations. In so-called fixed frequency division in mobile telephone systems, an attempt is made to avoid these interference signals by allocating well-separated frequencies to neighbouring cells. In the case of adaptive frequency division, however, the interference signals are measured on separate frequencies and only frequencies which are relatively undisturbed are used for a connection. Despite this, however, the problem whereby separate base stations and separate mobile stations disturb one another still occurs. For instance, if the mobile station MS3 sends the signal C3 to the base station BS3, a disturbing interference signal I3 is sent to the base station BS1 at the same time. Similarly, the mobile station MS2 also sends an interference signal I2 to the base station BS1. In order to determine whether or not a connection has sufficiently good properties for two-directional communication, the C/I-value of the connection can be estimated in both the uplink and the downlink stages of the connection set-up. The C/I-value for the uplink of a connection is the quotient between the signal strength of the own or local carrier frequency which a receiving base station detects and the combined signal strength from mobile stations which transmit on the same or closely proximal frequencies which are detected by the same base station. In time division systems, for instance TDMA (Time Division Multiple Access), it is assumed that the interfering or disturbing mobile stations utilize the same time slot as that used by the disturbed base station. For instance, the C/I-value in the uplink for the connection between the mobile station MS1 and the base station BS1 is C1/(I2+I3). A C/I-value can be defined for the downlink of the connection in a corresponding manner. The noise level of the connection is also calculated in the I.

In addition to being influenced by the C/I-value of the connection, the properties of a connection are also influenced by a number of other parameters, for instance the transmission power P of a mobile station and a base station respectively, the interference I and the traffic level.

The relationship between the C/I-value, the I and the transmission power P in respect of a connection between the base station BS1 and the mobile station MS1 will be readily understood from the following hypothesis. Assume that the base station BS1 has access to a given number of channels which have the measured interference values I. The interference values I of the various channels are stored and sorted into a list in accordance with their order of magnitude. Since the interference I is a time mean value measured over a long time period, the interference can be considered to be generally constant during a shorter time period. The mobile station MS1 can vary the signal strength C1 by transmitting with a varying power P. The greater the transmission power P, the greater the signal strength C1. When the signal strength C1 increases, the C/I-value of the connection will also increase, as will also the interference that is generated in the surroundings of the frequency concerned and, when applicable, the time slot. Neighbouring frequencies may also suffer increased interference or disturbance.

Figure 2A:
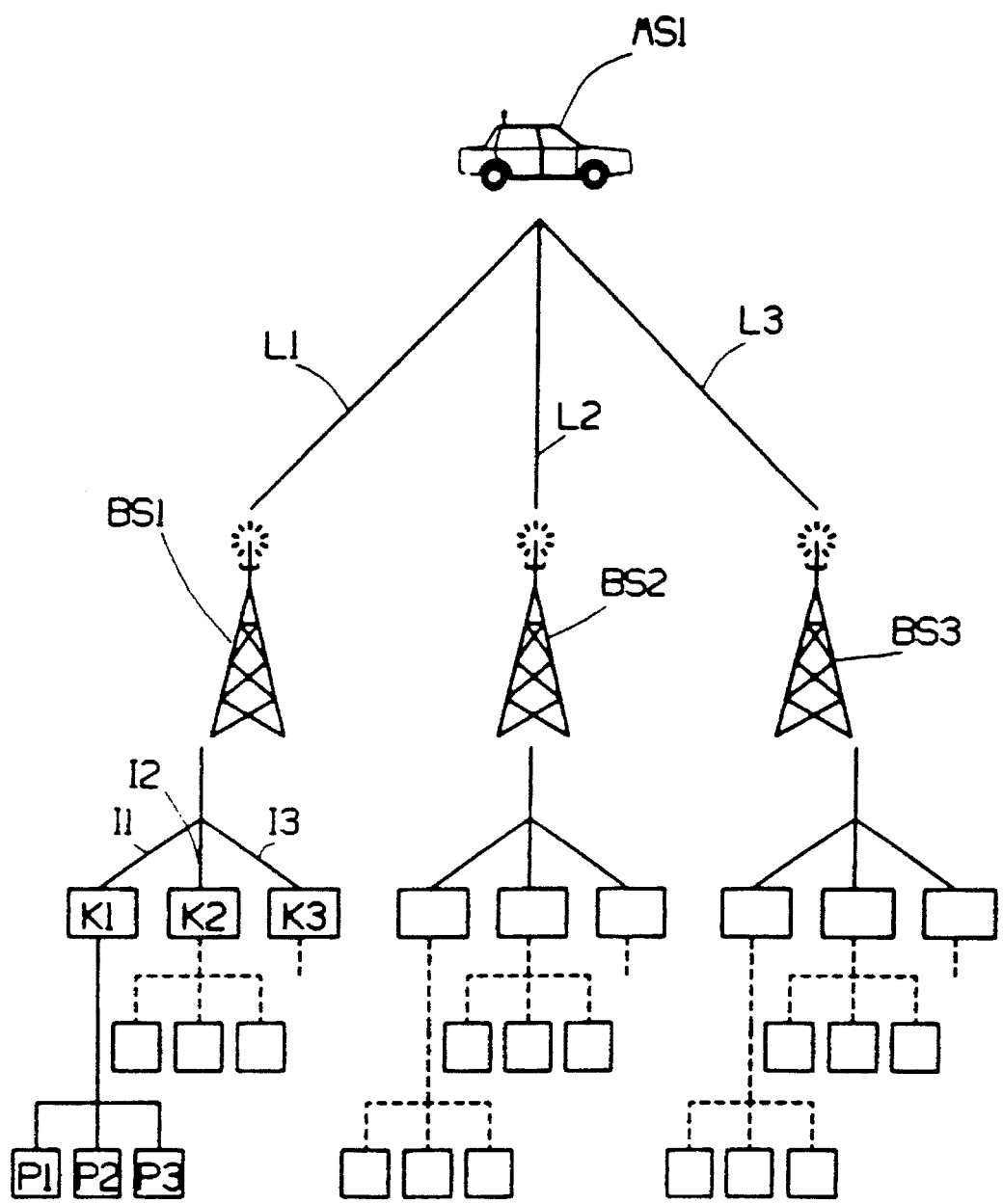
FIG. 2a is a schematic illustration of signal routes and channels in a mobile telephone system.

One of the problems solved by the present invention is that of allocating a channel for communication between a base station BS and a channel for communication between a base station BS and a mobile MS for a connection between the subscriber A and the mobile station MS1, for instance. According to known methods and according to the simplified FIG. 2a illustration in traditional mobile telephone systems, the mobile station MS1 chooses a channel for a connection in the following way. There is first chosen a base station from a number of base stations, in the illustrated example the base station BS1, whereafter a channel to which the selected base station BS1 has access in the system is chosen from a number of channels K1–K3. Finally, the transmission power on the channel is adjusted to one of the power states P1–P3 so as to fulfil a predetermined criterion regarding the signal strength of the connection. The signal strength of a connection is determined in a first proximation from the power P at which the mobile station MS1 and the base station BS1 transmit, and also from the degree of attenuation L1 between the mobile station MS1 and the base station BS1. As illustrated in FIG. 2a, the choice of base station BS1, BS2 and BS3 is determined by the attenuation L, because the base station that exhibits the smallest attenuation is chosen, in this case the base station BS1 with attenuation L1. The choice of channels K1, K2 and K3 is controlled by the interference I, i.e. the channel with the lowest interference is selected, in the illustrated case channel K1 with interference I1. Finally, the transmission power P is adjusted between the power states P1, P2, P3 in the selected channel, so that the connection will fulfil a predetermined signal strength criterion. The power state in the illustrated embodiment is P2. Thus, the connection uses the base station BS1, the channel K1 and the power state P2.

Figure 2B:
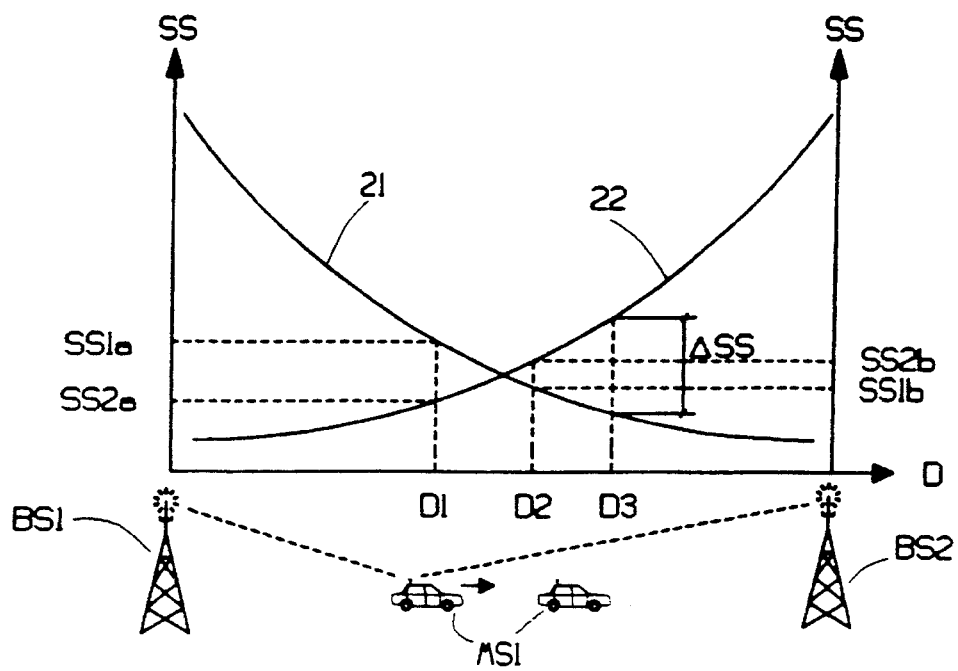
FIG. 2b is a diagram which illustrates the attenuation in the strength of signals from two base stations.

FIG. 2b illustrates diagrammatically how attenuation of the signal strength SS from the base stations BS1 and BS2 varies with the position of the mobile station MS1 in relation to the base stations. A curve 21 illustrates the signal strength SS from the base station BS1 and a curve 22 illustrates the signal strength SS from the base station BS2. As mentioned, in traditional mobile telephone systems a base station is chosen by measuring the extent to which the signal strength SS is attenuated from respective base stations.

Assume that the mobile station MS1 is located in position D1 according to FIG. 2b and is prepared to establish a connection. The mobile station MS1 measures the strength of the signal from base station BS1 and base station BS2 respectively, which in the illustrated case are SS1a and SS2a. Since the strength of the signal from the base station BS1 is attenuated to a lesser extent, the connection is set-up between the base station BS1 and the mobile station MS1.

On the other hand, if the mobile station MS1 is located in position D2 when a connection is to be set-up, the base station BS2 is used because this base station has a higher signal strength SS2b in position D2. Also assume that the mobile station MS1 has established a connection with the base station BS1 in position D1 and moves in a direction towards the base station BS2. In position D2, the strength SS2b of the signal from base station BS2 is higher than the strength SS1b of the signal from the base station BS1. However, no change of base station takes place until position D3 is reached, when the difference in signal strength between the base stations BS2 and BS1 exceeds a threshold value ASS, there thus being obtained some form of hysteresis effect. Thus, a mobile station in position D2 which intends to establish a connection will choose the base station BS2, whereas the same mobile station MS1 which has already established a connection in position D1 and moves towards the base station BS2 in position D2 will continue to use the base station BS1. The hysteresis is used to prevent repeated changes of base station for a mobile which moves in the proximity of a cell boundary. The drawback with this method of changing base stations is that the mobile moves into neighbouring cells before a change of base station takes place. In this case, it is necessary to dimension the base stations for a larger cell and therefore transmit an unnecessarily high power, which generates interference in the mobile telephone system. The mobile stations must also transmit at a higher power, since they are located further from the base stations, these base stations also generating unnecessarily high interference levels. Another drawback is that the system does not take into account the number of transmitters/receivers or channels that are available to the base stations. In a mobile telephone system, it is more convenient to accept a base station which has somewhat greater attenuation than to use the last free transmitter/receiver of an adjacent base station, as will be explained in more detail below.

The drawback with this known method of allocating a base station, a channel and a power state to connections between base stations and mobile stations is that it cannot be certain that the most system favourable combination of base station, channel and power state has been chosen. For instance, a neighbouring base station, e.g. base station BS2, may be able to offer to the mobile station MS1 channels that have much lower interference values I than can be offered by the base station BS1. Furthermore, this neighbouring base station may have a free channel for which a low transmission power can be permitted, meaning that this channel will have a lesser disturbing effect on other connections.

In accordance with the present invention, adequate assessment of the connections is achieved by allocating to each connection a load value, generally referenced B, which can be compared directly with different connections. The load value is contingent on a plurality of parameters or parameter combinations, such as the C/I-value, the transmission power P and the interference I. Each parameter or parameter combination is allocated a separate load value and the different load values are combined to form a common load value for the connection concerned. In the case of an ongoing connection, these load values can be calculated directly with a starting point from the current parameter value, for instance the power P and the interference I. In the case of a connection that is to be set-up between the base station BS1 and the mobile station MS1, the load values for separate channels for instance are estimated with a starting point from estimated parameter values. When changing channels or changing base stations, the load values are estimated in a manner described in more detail herebelow. A number of parameters and their load values will be described below.

Figure 3A:
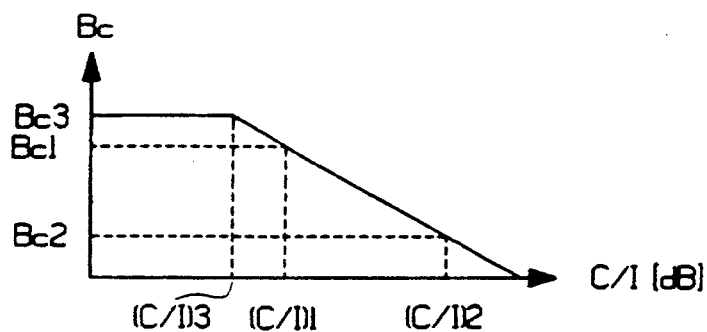
FIG. 3a is a diagram which illustrates the connection load value as a function of the C/I-value.

FIG. 3a illustrates diagrammatically how the parameter C/I influences the load value Bc for a connection downlink. A low parameter value (C/I) will mean that the connection has a poor quality and consequently the low parameter value is assigned a high load value Bc1. On the other hand, a high parameter value (C/I)2 means that the connection has a high quality and the high parameter value is therefore assigned a smaller load value Bc. The constant load value Bc3 at the beginning of the load curve is explained by the fact that the load value B does not increase when the C/I-value has fallen beneath a certain threshold value (C/I)3, which corresponds to the C/I-value of the connection, (C/I)3 being in the same order of magnitude as the noise level of the connection.

Figure 3B:
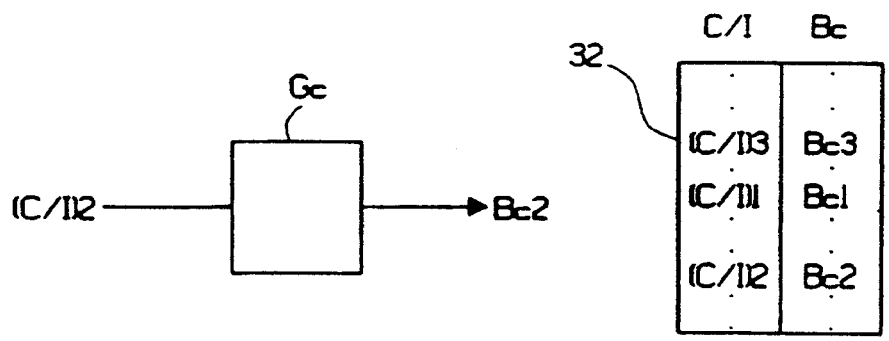
FIG. 3b is a block diagram illustrating a load generator which is used to generate a load value, and also shows a Table used by the load generator.

FIG. 3b illustrates a load generator Gc which functions to generate a load value B from a parameter. In the illustrated example, the parameter C/I, having a value (C/I)2, is applied to the load generator Gc, which then produces a load value Bc2 on its output. The load generator may, for instance, include a microcomputer which converts the parameter values to the load values. Alternatively, the load generator Gc may have stored in a memory circuit a list which converts the load generator input signals to corresponding output signals, i.e. signals which correspond to the load values. For instance, the input signal (C/I)2 is converted to the output signal Bc2. An example of one such list 32 is shown in FIG. 3b. The list 32 comprises two columns, wherein the C/I-values are listed in one column and the load values are listed in the other. Each row includes a C/I-value and an associated load value.

The C/I-value is merely an example of a parameter that can be used to generate a connection load value B. In the illustrated case, there is generated a load value B for the downlink of the connection. Corresponding load values are also generated in the uplink of the connection, although this is not shown. In order for the system to minimize the load value B of a connection, it is necessary for the system to take into account the contributions that other parameters make to a connection load value, in addition to taking into account the load values in both the uplink and downlink stages of the connection setup.

Figure 4A:
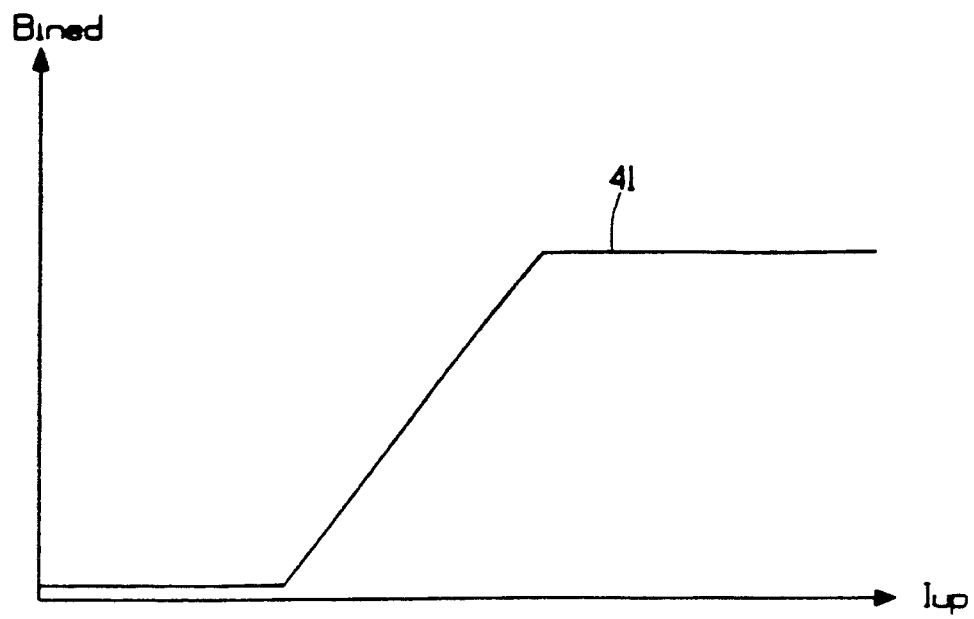
FIG. 4a is a diagram which illustrates the load value of a connection as a function of the interference on the connection uplink.
Figure 4B:
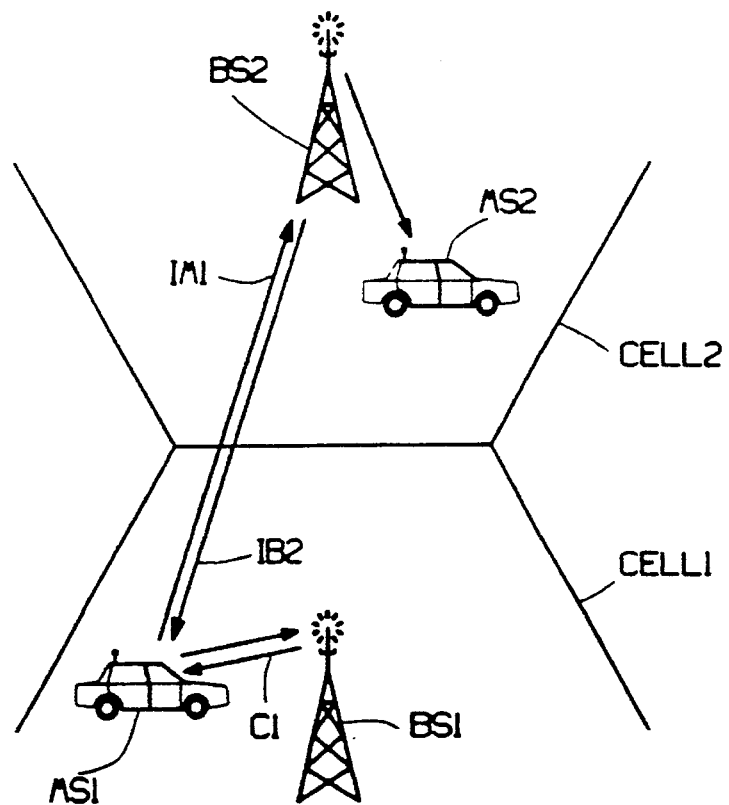
FIG. 4b is a view from above of two mobile stations and two base stations from FIG. 1b.

FIG. 4a illustrates diagrammatically the dependency of the load value Bined in the downlink of a connection on the interference Iup in its uplink. The load value Bined follows a curve 41. The diagram shown in FIG. 4a is best explained by considering the mobile stations BS1 and BS2 in the two neighbouring cells CELL1 and CELL2 according to FIG. 4b. Assume that communication takes place in one cell between the first mobile station MS1 and associated base station BS1. The first mobile station MS1 will then disturb the second base station BS2 with an interference signal IM1. If the second base station BS2 intends to set-up a connection with the second mobile station MS2, the base station BS2 will disturb the first mobile station MS1 with an interference signal IB2. The greater the interference IM1 detected by the base station BS2, the greater the interference IB2 caused by the base station BS2 on the mobile station MS1. The load value B in the downlink will therefore increase when the interference in the uplink increases. The load value is also generated in this case by a load generator of the aforesaid kind.

Figures 5A, 5B:
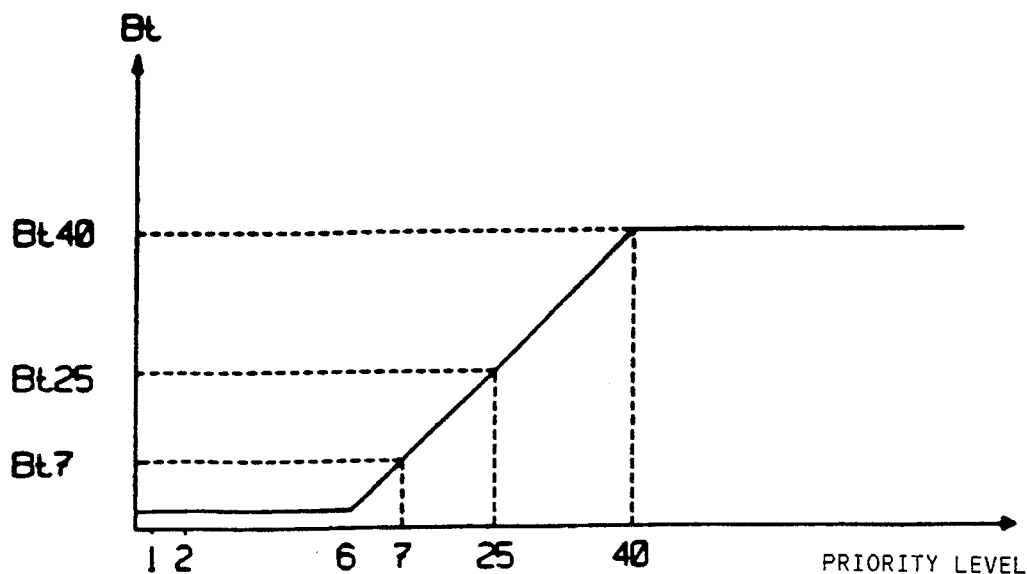

In this way, the parameter interference in uplink Iup generates a load value for the downlink of the connection. Correspondingly, the parameter interference in downlink Ined generates a load value for the uplink of the connection setup, although this is not shown. As will be understood, the reasoning that a parameter which influences the load value for a connection uplink will also influence the load value in the connection downlink, and vice versa, can be extended to also apply to other parameters, for instance transmission power P, C/I-value, etc. The diagram presented in FIG. 5a illustrates the load value Bt for the downlink of a connection as a function of the channel priority level of a base station, for instance the base station BS1. When a channel is to be allocated, the channel is often ranked in a list 5 in accordance with the properties of the respective channel, for instance it may be ranked in accordance with the interference level of the channel, i.e. in accordance with the interference value I of the channel, as illustrated in FIG. 5b. The list may be stored in a memory circuit and includes columns containing priority levels, channel numbers and interference levels. The list may be supplemented readily with a load value column, as shown in broken lines. The memory circuit and the list stored therein may then be included in a load generator and used to convert the parameter Priority level to a corresponding load value in a manner similar to that explained with reference to FIG. 3b above. The interference value I is a time mean value measured over a long time period, in the order of hours. The interference value I shows how the interference for a given channel has earlier been independent of how the channel is used for connections. A low priority value 7 in the diagram, i.e. a high list ranking, indicates that the channel has good quality properties, which is reflected in a low load value Bt7, whereas a high priority value 25 indicates poorer quality properties as reflected by a higher load value Bt25. It is therefore natural that the load value of the downlink of a connection will increase when the priority level increases, as illustrated diagrammatically in the Figure. FIG. 5a also shows that the load curve flattens after a priority level of above 40, which gives a maximum load value Bt40 in respect of the parameter Priority Level. Thus, the Priority Level parameter generates a load value B for the downlink stage of a connection. Correspondingly, the Priority Level parameter also generates a load value in the uplink stage of the connection. In order to obtain an adequate indication of how the Priority Level parameter influences the load value of a connection, it will be understood that the system shall take into account the load value that is generated both in the uplink and in the downlink stages of a connection even in this case.

Figure 6A:
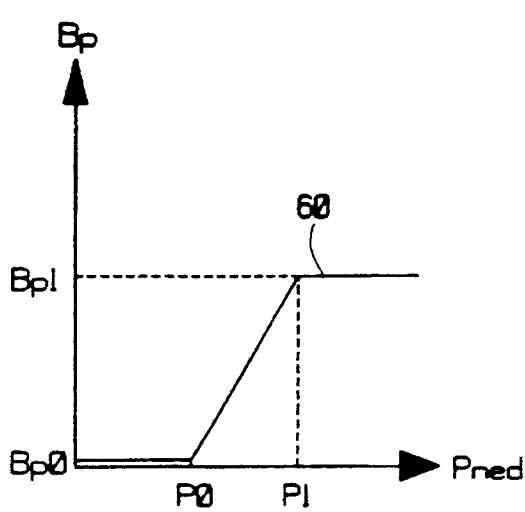
FIGS. 6a, b, c, d and e are diagrams which illustrate how different parameters affect a connection load value.

FIG. 6a illustrates how the parameter Transmission Power in the downlink Pned influences the load value Bp of the downlink of a connection. The diagram shows that initially the load value Bp is constant for a transmission power which is lower than Po. The load value Bp then increases linearly with transmission power between the power values P0 and P1, which correspond to the load values Bp0 and Bp1 respectively. The load value Bp has a constant value Bp1 for power values above the value P1.

Figure 6B:
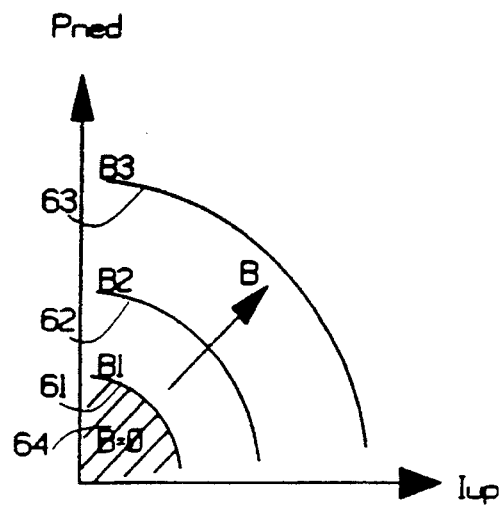

FIG. 6b illustrates diagrammatically the load value B of a connection when taking into account both the interference in the connection uplink Iup and the power in the connection downlink Pned. The interference in the uplink Iup is plotted on the horizontal axis, while the power in the connection downlink Pned is plotted on the vertical axis. Load value variations are plotted in the form of gradient curves 61, 62 and 63. The load value is zero in the hatched area 64. The load value B1 is on the curve 61 and this value then increases to B2 and B3 respectively on the following gradient curves 62 and 63.

Figure 6C:
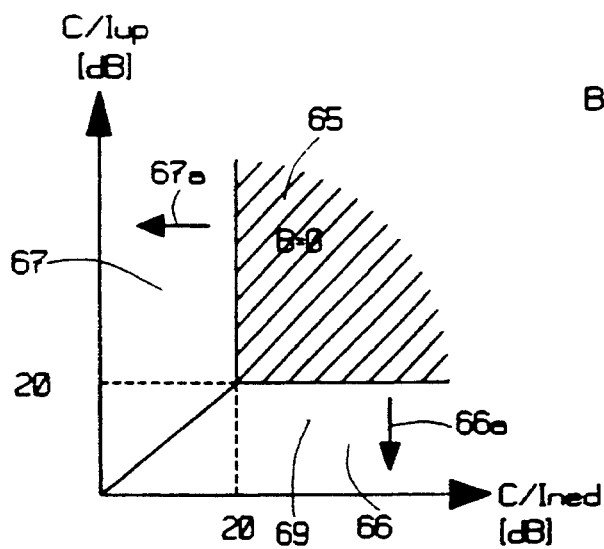

FIG. 6c is a diagram in which there are plotted variations of the load value B with the C/I-value in a connection uplink and a connection downlink. In the hatched region 65, i.e. when the C/I-value exceeds 20 dB for both the uplink and the downlink, the load value is zero. In the region 66, the load value is independent of the C/I-value in the downlink (C/I)ned. If a connection has the C/I-values in the uplink and the downlink respectively, which corresponds to the point 69, the load value is not changed when the C/I-value for the downlink decreases in the region 66. On the other hand, if the downlink C/I-value falls from point 69 into the region 67, the load value B will increase. In the region 67, the load value B is, instead, independent of the C/I-value in the connection uplink (C/I)up. In the region 66, the load value increases from zero at the border to region 65 linearly with the load value B4 for each decibel of the decrease of the C/I-value in the uplink, as shown by an arrow 66a. Correspondingly, in the region 67, the load value increases by the value B4 for each decibel that the C/I-value of the downlink decreases, as shown by an arrow 67a. The worst of the links thus determines the load value B.

Figure 6D:
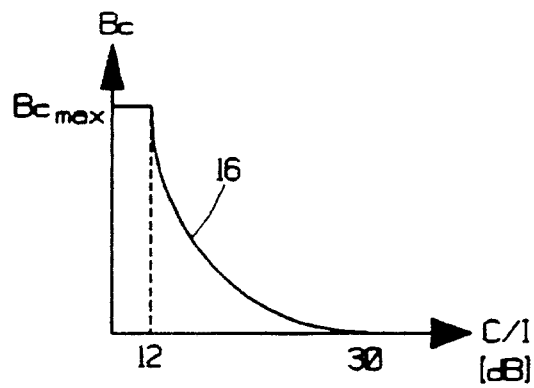

FIG. 6d shows the load value variation with the C/I-value for a connection. In this case, a somewhat more complicated function is used than that described with reference to FIG. 3a, which also illustrates a variation of the load value with a variation in the C/I-value. FIG. 6d shows a load curve 16 which can be described mathematically in terms of a second degree function, in accordance with the following:

$$\begin{aligned} Bc &= Bc_{max}*((C/I-30)/(12-30))^2; & 12 < C/I < 30 \\ &= 0; & C/I \geq 30 \\ &= Bc_{max}; & C/I \leq 12 \end{aligned}$$

Functions other than those described above can, of course, be used. It will be understood that more complicated functions can also be used for other parameters.

Figure 6E:
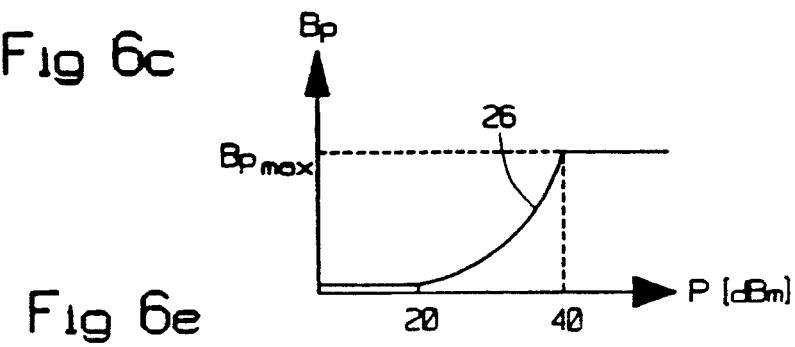

FIG. 6e shows variations of the load value Bp with transmission power P in a somewhat more complicated function than in FIG. 6a. FIG. 6e illustrates a second degree curve 26 which describes the variation of the load value with the power P. The curve is described mathematically as follows:

$$\begin{aligned} Bp &= Bp_{max}*((P-20)/(40-20))^2; & 20 < P < 40 \\ &= 0; & P \leq 20 \\ &= Bp_{max}; & P \geq 40 \end{aligned}$$

It will be understood that the curve 26 may be made more complicated in an alternative embodiment also in this case.

Another parameter that can be assigned to a load value is the performance of the mobile station, for instance the type of receiver, antenna or decoder with which the mobile station is equipped and the bit rate which is used by the mobile station, for instance so-called half rate or full rate. The performance parameter m can be multiplied by the combined total load value, as described below. The system may also take into account the performance of the base stations in a corresponding manner. Parameters that are related to the category of the mobile station can also be combined, for instance with the aid of the load values the system is able to take into consideration such mobile stations as those used for particularly important calls, such as emergency calls to the police or the ambulance services.

Figure 7A:
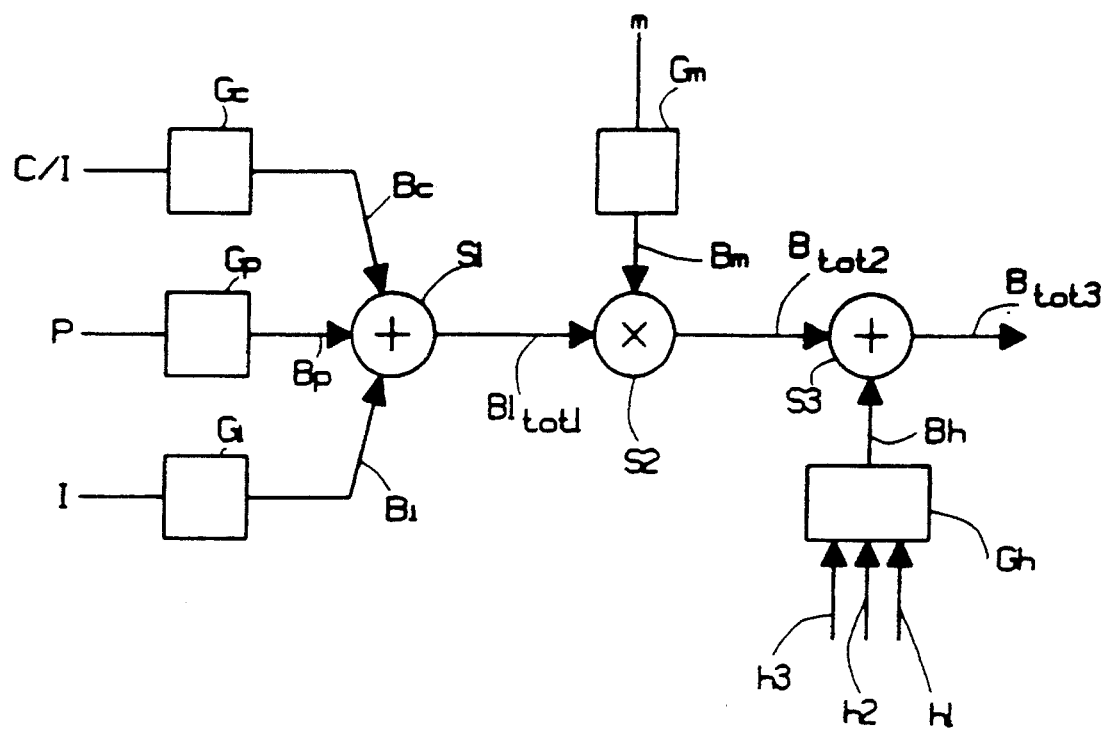
FIG. 7a is a block schematic which includes load generators and combining circuits.

FIG. 7a is a block diagram which illustrates the combination of three different load values which have been generated from three different parameters. The three different parameters C/I, P and I are delivered to corresponding load generators Gc, Gp and Gi, each of which produces a respective load value Bc, Bp and Bi which is dependent on its respective parameter. These load values are estimates which are obtained by estimating the values of the different parameters or the actual values obtained by measuring the parameters. The load generator Gc for the parameter C/I has been described with reference to FIG. 3b. The load generators Gp and Gi are constructed similarly to the generator Gc and generate the estimated load values in accordance with the respective diagrams of FIG. 6a and FIG. 4a. The three different load values are then delivered to a combining circuit S1, which in the simplest case sums the different load values to obtain a total load value $B1_{tot1}$. Other combining methods may also be used, of course. For instance, the load value Bc that has been produced from the parameter C/I may be weighted with a given factor prior to summation. The combined load value $B1_{tot1}$ can also be multiplied by a load value after summation. FIG. 7a also shows a load generator Gm which generates a load value Bm in dependence on the parameter m, the mobile performance. The load value Bm is then combined with the load value $B1_{tot1}$ from the output of the combining circuit S1 in a second combining circuit S2, which in the case of the illustrated example is a multiplier, therewith to obtain a new total load value $B_{tot2}$. A further load generator Gh which generates a load value Bh in dependence on a parameter hysteresis h is delivered to a combining circuit S3 which summates the load value Bh with the combined load value $B_{tot2}$ obtained on the output of the combining circuit S2. The parameter hysteresis will be explained in more detail below with reference to FIG. 8. There is thus produced on the output of the combining circuit S3 a load value $B_{tot3}$ which is dependent on the parameters C/I-value, power P, interference I, mobile performance m and hysteresis h. By adding more load generators and combining the generated load values, it is possible, in accordance with the invention, to add further parameters which influence the total load value of the connection between subscriber A and the mobile station MS1.

Figure 7B:
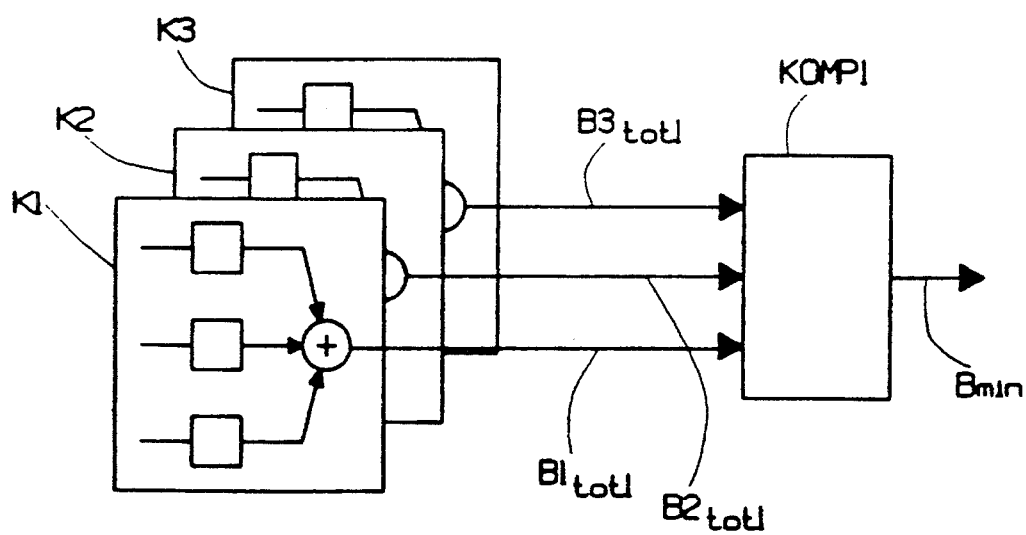
FIG. 7b is a block schematic which includes several blocks from FIG. 7a and a comparator.

Now assume that a connection shall be established between the mobile station MS1 in FIG. 1b and the subscriber A via a base station. According to a simplified embodiment of the invention, the system will then choose an available base station from the base stations BS1, BS2 or BS3, in accordance with known methods. For instance, the selection may be made by considering the signal strengths SS from respective base stations, as earlier described with reference to FIG. 2b. The selected base station, in the illustrated case BS1, has access to a number of channels K1, K2 and K3, of which one shall be allocated. FIG. 7b is a block diagram in which each block corresponds to a channel K1, K2 and K3 for which estimated load values $B1_{tot1}$, $B2_{tot1}$ and $B3_{tot1}$ are generated by estimating the values of the various parameters. FIG. 7b also shows a comparator KOMP1 in which the load values are compared.

The channels K1, K2 and K3 have different interference values I which are measured over a relatively long time period, as described above. According to the invention, each channel is given a smallest load value, by combining and optimizing the parameters C/I, I and P to obtain the total load value $B1_{tot1}$, $B2_{tot1}$ and $B3_{tot1}$ respectively in accordance with the description of FIGS. 7a and 7b. The system optimizes the total load value for each channel, by varying the transmission power P and allocating to the connection that channel K1, K2 or K3 which has the lowest total load value. When the parameter P varies, the C/I-value of the channel also changes. Allocation of the channel K1, K2 or K3 that has the lowest total load value $B1_{tot1}$, $B2_{tot1}$ or $B3_{tot1}$ is effected by comparing these load values in a comparator KOMP1, in accordance with FIG. 7b. The comparator KOMP1 receives the total load values on its inputs and delivers the lowest of these load values on its output, this lowest value being designated Bmin. In the illustrated example, Bmin=$B1_{tot1}$, in other words the channel K1 has the lowest load value and is chosen for the connection. Subsequent to selecting channel K1, the connection between the base station BS1 and the mobile station MS1 is established on this channel in a conventional manner, using known signalling procedures.

When the connection has been established on the selected channel K1, the system tests, in a corresponding manner, other relevant channels K2 and K3 which belong to the base station BS1 in which the connection between the mobile station MS1 and said base station BS1 is in progress, by estimating the parameter values and thereby obtain estimated load values. This is achieved by virtue of the system estimating the change in the load values $B1_{tot1}$, $B2_{tot1}$ and $B3_{tot1}$ for the channels K1, K2 and K3, and regularly optimizing the load values of each channel K1, K2 and K3. The system uses the channel which provides the lowest connection load value all the time. A change in the load value of a connection may, for instance, be due to the mobile station moving in the mobile telephone system, or because new active mobile stations have entered the system. The load value in this case is also a value which has been generated by combining a plurality of parameters, for instance C/I, I and P in accordance with the description of FIG. 7a. When a channel which has a lower load value than the load value of channel K1 is encountered, a change of channel takes place in a known way using known signalling procedures.

According to an extended embodiment of the invention, the system is able to add a predetermined load value Bh which corresponds to a channel change in the system for the connection between the mobile station MS1 and the base station BS1 or an adjustment to the power P with the intention of optimizing the load value of that channel which is used for the ongoing connection. FIG. 8 illustrates examples of such additional load values. For instance, the procedures for adjusting the power P of a channel, designated h3, are associated with a load value Bh3. Correspondingly, the procedures for channel changes, designated h2, for instance a change from channel K1 to channel K2, are associated with a load value Bh2. The load value Bh2 is higher than the load value Bh1 and consequently the channel changing procedures are more complicated than the power adjustment procedures. In other words it is necessary for the system to perform a large number of signal processing procedures when effecting a channel change for the connection concerned, in comparison with adjusting the power P for the channel used by the connection. FIG. 8 also shows a procedure hi which is associated with a load value Bh1, as will be explained in more detail below with reference to FIG. 11.

The load values that are generated in conjunction with power adjustment and channel change respectively are added to the total channel load value, for instance the load value $B1_{tot1}$ for channel K1 according to FIG. 7a. The load value Bh3 relates to a power adjustment for the channel K1 used for the connection, whereas the load value Bh2 relates to the load value that occurs when changing channels, in the illustrated case when changing from channel K1 to channel K2. In this case, the load generator Gh receives on its inputs the signals h1, h2 and h3, which are only active one at a time. A load generator Gh delivers on its output the load value Bh, which is one of the load values Bh1, Bh2 or Bh3. The load value Bh is summed with the load value $B_{tot2}$ in the summing circuit S3, which then delivers a load value $B_{tot3}$ in accordance with FIG. 7a. In the illustrated case, it is assumed that the load value for the mobile performance Bm=1, so that $B_{tot2}$ will equal $1*B1_{tot1}$. In this case, the load value $B_{tot2}$ is delivered to the comparator KOMP1 instead of the load value $B1_{tot1}$ according to FIG. 7b.

The procedure followed in traditional mobile telephone systems when changing base stations has been described above with reference to FIG. 2b. When practicing the present invention, the inventive system does not only take the attenuation L of the signal strength into account when changing base stations, but also takes other parameters into account. The system allocates to the load values a number of parameters which are associated with the choice of base station, for instance the signal strength attenuation L, the number of available transmitters/receivers N in a base station, and the number of transmitters/receivers ρ in use in a base station. The load values for each parameter are then combined to form a total load value for respective base stations. When a connection is to be set-up between the mobile station MS1 and a base station, the choice of base station is then governed by the total estimated load values of respective base stations BS1, BS2, BS3. FIG. 9a illustrates the combination of the load values of the parameters Signal Strength L between the mobile station MS1 and the base station BS1, the number of available transmitters/receivers N in a base station, and the number of transmitters/receivers ρ in use in the base station. Each of three different load generators G1, Gn, Gρ generates a respective load value B1, Bn and Bρ which are combined in a combining circuit S4. In the simplest case, this circuit is a summation circuit which generates a total load value, for instance Bb1 for the base station BS1.

According to an alternative embodiment of the invention, the letter N identifies the number of available channels in a base station and the sign ρ identifies the number of channels that are in use.

Figure 9B:
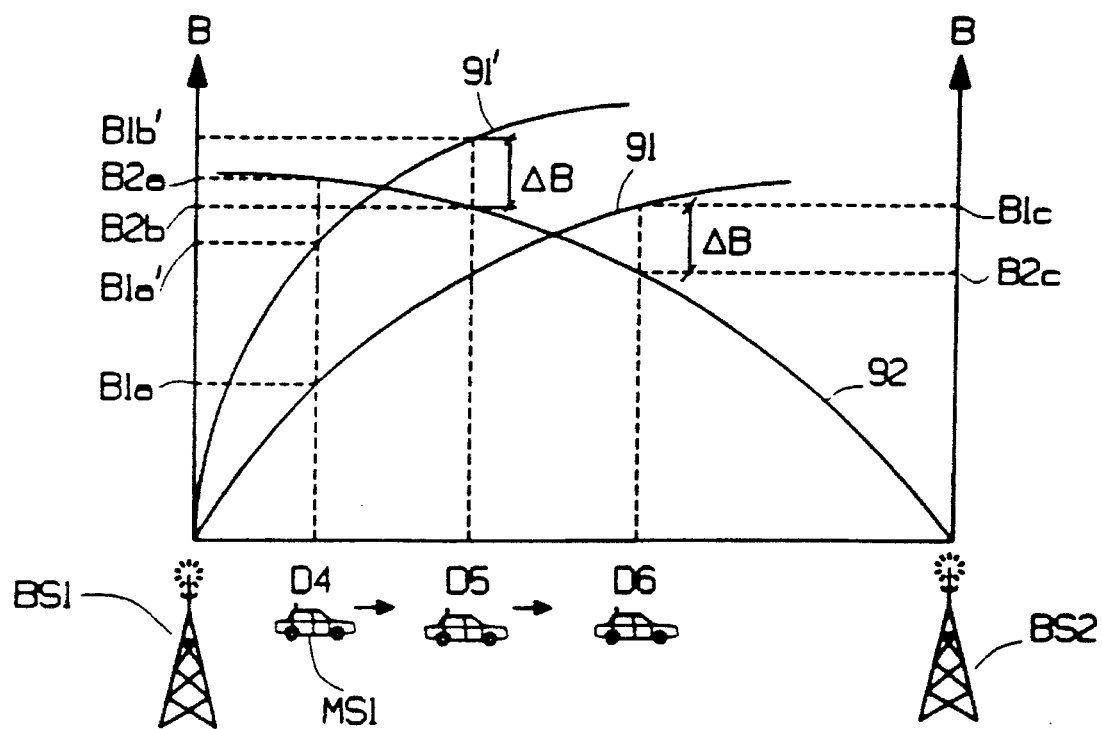
FIG. 9b is a diagram showing load curves for two base stations.

FIG. 9b is a diagrammatic illustration of the inventive method of changing base stations. The curves 91 and 92 illustrate the dependency of the load value B of a connection between the mobile station MS1 on the distance to respective base stations BS1 and BS2. The curves 91 and 92 show that the base stations BS1 and BS2 transmit with approximately the same power and have the same number of available transmitters/receivers.

Assume that the mobile station MS1 is located in position D4 and intends to set-up a connection. The mobile station MS1 will then select the base station BS1, since the load curve 91 in this position gives a load value B1a which is lower than the load value B2a belonging to the base station BS2. The mobile station MS1 then moves in a direction towards the base station BS2 and changes base station to base station BS2 in position D6, as the load value B1c on the curve 91 then exceeds the load value B2c on the curve 92 by a predetermined threshold value ΔB.

Further assume that in another situation, the number of transmitters/receivers available to the base station BS1 decreases. The load curve 91 of the base station BS1 will then change to a curve 91' as shown in FIG. 9b. If the mobile station intends to set-up a connection in position D4, the mobile station will still choose the base station BS1, as the load value B1a' is lower than the load value B2a. If, as before, the mobile station moves in a direction towards the base station BS2, the mobile station will change base stations as early as in position D5, as the load value B1b' for curve 91' exceeds the load value B2b by the predetermined threshold value ΔB. The description of FIG. 9b only takes into account the own load values of the base stations and does not take into account the load values of the channels.

FIG. 10 illustrates how the choice of base station is made in accordance with the inventive embodiment described with reference to FIG. 9a when a connection is to be set-up. A comparator KOMP2 receives on its inputs the estimated total load values Bb1, Bb2, Bb3 for respective base stations BS1, BS2 and BS3 and delivers on its output the smallest of the load values Bb1, Bb2 and Bb3, designated Bbmin. It is assumed in this example that the parameter Mobile Performance m equals 1.

According to an alternative embodiment of the invention, the system takes into account all parameters that are associated with a connection at the same time, by combining the load values generated from the various parameters. If a connection is to be set-up between the mobile station MS1 and the subscriber A via a base station, the load values generated, for instance, from the parameters C/I-value, interference I, transmission power P, channel priority level, attenuation L between base station and mobile station, the number of available transmitters/receivers in the base stations N, the number of transmitters/receivers in use in the base station ρ, the mobile performance m and the hysteresis h are combined to form a total load value $B_{tot3}$ in accordance with FIG. 11. FIG. 11 shows the load generators Gc, Gp and Gi which, as in the earlier case, each generate a respective load value Bc, Bp and Bi, which are combined in the combining circuit S1 to form a total load value $B1_{tot1}$. As described above, the load generators G1, Gn and Gρ also generate the individual load values that are combined in the combining circuit S4 to form a load value Bb1. The load values Bb1 and $B1_{tot1}$ obtained from the combining circuits S4 and S1 respectively are combined in a further combining circuit S5, for instance a summation circuit, to form a load value $B1_{tot1a}$. Also shown is the load generator Gm which receives the parameter Mobile Performance m, and the load generator Gh which receives the parameter Hysteresis h, which have earlier been described. The load value Bm obtained from the load generator Gm is combined with the load value $B1_{tot1a}$ in the combining circuit S2, which in the illustrated case is a multiplier. The combining circuit S2 produces a load value $B_{tot2}$ which, in turn, is combined with the load value Bh obtained from the load generator Gh, to form in the combining circuit S3 a total load value designated $B_{tot3}$. It will be noted that this combination is made for several base stations, for instance the base stations BS1, BS2 and BS3 and for individual channels of these base stations.

The system estimates for all relevant combinations of base stations, channels and power states the load values that can be compared directly with one another when wishing to set-up a connection. The system then selects the combination of base station, channel and power state which will generate the smallest load value.

Subsequent to having set-up the connection, the system estimates the load values for all relevant combinations of base station, channel and power state and chooses that combination which provides the lowest load value at that moment in time. In this case, those load values Bh that are associated with power adjustment, channel change and base station change are also combined, as earlier described.

Assume that the connection between the mobile station MS1 and the subscriber A is set-up via the base station BS1 in accordance with FIG. 1a. Also assume that the connection uses channel K1 and is then loaded with a load value $B_{tot3}$ which, with reference to FIG. 11, is comprised of $B_{tot3}=(B1_{tot1}+Bb1) * Bm+Bh$, where $Bh=0$, since it is assumed that the connection is optimized for channel K1. The load value $B_{tot3}$ is then equal to the load value $B_{tot2}$, i.e. $B_{tot3}$ is equal to $B_{tot2}$. The system now tests for all relevant combinations of base stations, channels and power states in order to ascertain whether or not the load value of the connection can be reduced. Should the connection instead use the base station BS2 and an associated channel, for instance channel K4, the load value $B_{tot4}$ for the connection will reach $B_{tot4}=(B4_{tot1}+Bb2) * Bm+Bh$, where $By=Bh1$, since a change in base station takes place from base station BS1 to base station BS2. $B4_{tot1}$ is a load value for channel K4 which the base station BS2 is assumed to use, this value corresponding to the load value $B1_{tot1}$ for channel K1 used by the base station BS1. Bm is assumed to be identical in both instances, because the performance of the mobile station MS1 has not changed. The system changes base station when $B_{tot4}$ is $<B_{tot2}$. The choice is affected in a comparator KOMP3 in accordance with FIG. 12. The comparator KOMP3 receives the load values $B_{tot2}$, $B_{tot4}$ and $B_{tot5}$ which correspond to the load values of the connection when the base station BS1 and channel K1 are used, the base station BS2 and channel K4 are used and when base station BS3 and a channel K5 is used respectively. In the illustrated case, the load value $B_{tot4}$ is the smallest load value and consequently this value is delivered on the output of the comparator KOMP3.

If a connection is to be set-up between the mobile station MS1 and the subscriber A via a base station, the system tests all relevant combinations of base stations, channels and power states and compares the total estimated load values for the various alternatives and chooses in a comparator that alternative which provides the lowest load value. The load value Bh is then By=0, since no change of channel or base station takes place. The power state is assumed to be optimized for each channel before selecting the base station and the channel for making the connection.

According to another embodiment of the invention, the system tests alternative combinations of base station, channel and power state for a connection solely when the current load value of an established connection exceeds a given threshold value Bt1, i.e. B>Bt1. Optimization of the resources of a mobile telephone system which operates with a relatively low traffic level is of less importance, and consequently the system can be permitted to optimize the load value solely under certain conditions.

According to still another embodiment of the invention, the sum of all the load values of the different connections within a base station is optimized. The system monitors the load values of the various connections as in the earlier cases, but now also ascertains whether or not the sum of all of the load values of the various connections within a base station can be decreased. For instance, the system ascertains whether or not two ongoing connections can change channels with the intention of reducing the sum of the load values of these two connections, as will be illustrated in the following example. Suitably, two connections are considered, of which one connection is associated with the largest load value within the base station and the other connection is associated with the lowest load value within said base station. The subscriber A is connected with the mobile MS1 via the base station BS1 on the channel K1. A further subscriber A2 is connected with a mobile station MS4 on channel K2 via the base station BS1, in accordance with FIG. 1b. The system generates a load value $B1_{MS1}$ for the ongoing connection between subscriber A and the mobile station MS1 on channel K1, and generates an estimated load value $B2_{MS1}$ for a connection between the subscriber A and the mobile station MS1 on the channel K2. The system also generates a load value $B1_{MS4}$ for the ongoing connection between the subscriber A2 and the mobile station MS4 on the channel K2, and generates an estimated load value $B2_{MS4}$ for the connection between the subscriber A2 and the mobile station MS4 on the channel K1. The sum of the estimated load values $B2_{MS1}$ and $B2_{MS4}$, incorporating the hysteresis values for the channel change, is compared with the sum of the current load values $B1_{MS1}$ and $B1_{MS4}$. If the sum of the current load values $B1_{MS1}$ and $B1_{MS4}$ exceeds the sum of the estimated load values $B2_{MS1}$ and $B2_{MS4}$, a change of channel is effected so that the subscriber A connection is made on channel K2 and the subscriber A2 connection is made on channel K1. The system will also effect the aforesaid channel change when the load value of one connection increases, when the load value of the other connection decreases, to an extent such that the sum of the load values decreases after making the change. A change of channel can also be effected for three or more connections. The load value may then increase on one or more connections, but decrease to such an extent for the remaining connections that the sum of the load values decreases after making the channel changes.

This method can also be extended to apply when optimizing the sum of the load values for all connections that belong to several base stations or to the connections in the whole of the mobile telephone system. Assume that two connections having two different load values are set-up in two different cells between the mobile stations MS1 and MS2 and the base stations BS1 and BS2 respectively. The system chooses to reverse the connections, so that a connection is established between the mobile station MS1 and the base station BS2, and another connection is established between the mobile station MS2 and the base station BS1, when the total load value of the two connections decreases. The load value may increase in one cell and decrease in the other cell. A change or switch may also be effected between three or more base stations. The system is also able to reduce the power in one connection, even though this would increase the load value of just this connection. A power reduction can result in lower load values for other connections, which compensates for the increase in the load value caused by said power reduction, whereby the sum of the load values falls subsequent to said power reduction. For instance, a lower power state can result in less disturbance and interference on other connections in neighbouring cells that use the same frequencies and, when applicable, the same time slots.

It will be observed that in some instances the system can choose parameters which belong solely to one channel or solely to one base station, etc., as will be evident from the descriptions of FIG. 7b and FIG. 10. The system is then also able to select base stations and channels in two stages and to then take into consideration in the first stage those parameters which belong to one base station and thereafter those parameters which belong to one channel. It should also be noted that the system takes into account the load values in both the uplink and in the downlink stages of a connection, as earlier described with reference to FIG. 4b. The system can be designed to combine the uplink load values and the downlink load values in some way or another. For instance, a mean value can be formed or the system can be designed to take only the worst load value into account. Alternatively, the load values that derive from the uplink and the downlink of a connection can be combined with remaining parameters in accordance with FIG. 11.

When describing FIGS. 5a and 5b mention was made as to how the load values for respective channel priority levels Pr are generated. The channel priority level, in turn, is a function of a parameter which discloses the quality of the channels measured over a given time period, for instance the interference I according to list 5 in FIG. 5b. The priority level of a channel can also be used to generate a load value which is considered as a threshold value $B_{th}$. As earlier mentioned in the description of FIGS. 5a and 5b, the priority level of the channels is updated on a regular basis.

The signal strength of a carrier wave is measured when allocating a channel, thereby enabling the C/I-value of the channel to be calculated. This C/I-value generates in turn a load value which has been earlier described with reference to FIG. 3a. In order for the channel to be allocated to the connection, it is necessary for the load value generated by the C/I-value to be smaller than the aforesaid threshold value $B_{th}$, which is decided by comparing the threshold value and the load value in the comparator KOMP1. Thus, when allocating a channel this threshold value is used to determine whether or not the quality of the channel is satisfactory. The threshold value $B_{th}$ varies in accordance with the priority level of the channel and the priority level, in turn, is dependent on the interference value of the channel. In this way, there is obtained a threshold value which is dependent on the priority level Pr of the channel. The priority level may also be dependent on other parameters, for instance on the bit error rate BER or the C/I-value.

In some mobile telecommunication systems there is a limit as to the number of channels for which the interference I can be measured. In this case, the list 5 shown in FIG. 5b can be divided into an upper and a lower part. The upper part of the list will then include those channels which a base station can use at that moment in time. The bottom part of the list will be comprised of so-called candidate channels. The mean value of the interference I is measured for the channels in the upper part of the list, in the aforedescribed manner. The candidate channels in the lower part of the list are tested in sequence at regular time intervals. The test is effected by changing a channel in the lower part of the list for that channel in the upper part of the list which has the highest load value or the lowest priority. This load value can be generated, for instance, in accordance with the priority level Pr of the channel, although other parameters can also be chosen or considered. The interference for the candidate channel now placed in the upper list is measured and a mean value is formed over a given time period, which in turn generates a priority level for the channel, wherein a load value for the newly arrived channel can be generated in accordance with its priority level Pr. The load value of the newly arrived candidate channel is then compared with the load values of the channels in the upper part of the list, wherein the newly arrived channel is sorted into the upper part of said list. A new candidate channel is then tested with the channel in the upper part of the list that has the lowest priority. All candidate channels are tested in the same way.

Alternatively, the load value of the newly arrived candidate channel can be compared with the load value of the channel that was removed from the upper part of the list. If the load value of the candidate channel is lower than the load value of the old channel, the candidate channel is allowed to remain in the upper part of the list. Otherwise, another candidate channel from the lower part of the list is tested. The candidate channels may be arranged, for instance, in a queue order, so that the candidate channels will be tested sequentially. In this way, all channels in the lower part of the list can be tested at regular time intervals and have the possibility of moving to the upper part of the list.

It has been described how the interference mean value is formed over a long period of time, so as to obtain a slowly variable interference value. The time mean value of the interference then influences the priority level. The priority level is updated in conjunction with changes in the mean value.

Alternatively, the priority level can be updated according to the number of times that the interference level of a channel has exceeded or fallen below a predetermined threshold value, so that the priority level will increase for a channel when its measured interference value often falls beneath the threshold value.

According to a further embodiment of the invention a threshold value $B_{th1}$ is used to determine whether or not the load value of a connection is satisfactory. For instance, when setting-up a connection the connection load value for a given set of parameter values is compared in the comparator KOMP1. The comparison made in the comparator KOMP1 is carried out in a manner similar to that described with reference to FIG. 7b. If the load value is smaller than the predetermined threshold value $B_{th1}$, the connection is set-up. On the other hand, if the load value is higher than the threshold value the system tests other values of the parameters and the new load value is in turn compared with the threshold value $B_{th1}$. If the system tests all conceivable parameter combinations that generate the load value without finding a load value which lies beneath the threshold value, the connection set-up is interrupted or broken-off. The system can then attempt to set-up the connection on a later occasion instead.

The threshold value $B_{th1}$ can also be used to change or switch channels within a cell should the load value of a connection exceed the threshold value $B_{th1}$ during the course of the call. The load value of the connection is then compared continuously with the threshold value in the comparator KOMP1. The load value of the new connection is also compared with the threshold value in the comparator KOMP1, it being necessary to lie beneath this threshold value in order for a change in channel to take place. If the system is unable to find a channel which generates a load value that lies beneath the threshold value, no channel change will take place or the connection is broken-off. Alternatively, the new connection can be compared with a second threshold value $B_{th2}$ which the load value must lie beneath in order to enable a change of channel to take place.

The threshold value can also be used in a similar way to effect handover, i.e. a change of channel and base station. The system will then initiate a handover procedure when the load value of the connection exceeds the predetermined threshold value that is established by comparison between the load value of the current connection and the threshold value in the comparator KOMP1. It is then necessary for the load value of the new connection to lie beneath the threshold value in order for a handover to take place, this being checked in the comparator KOMP1.

If the system is unable to find a new connection through any of the base stations that can offer a channel which generates a load value that lies beneath the threshold value no handover will take place, or the connection is broken-off. A second threshold value $B_{th2}$ can also be used for the new connection in this case.

Figure 13:
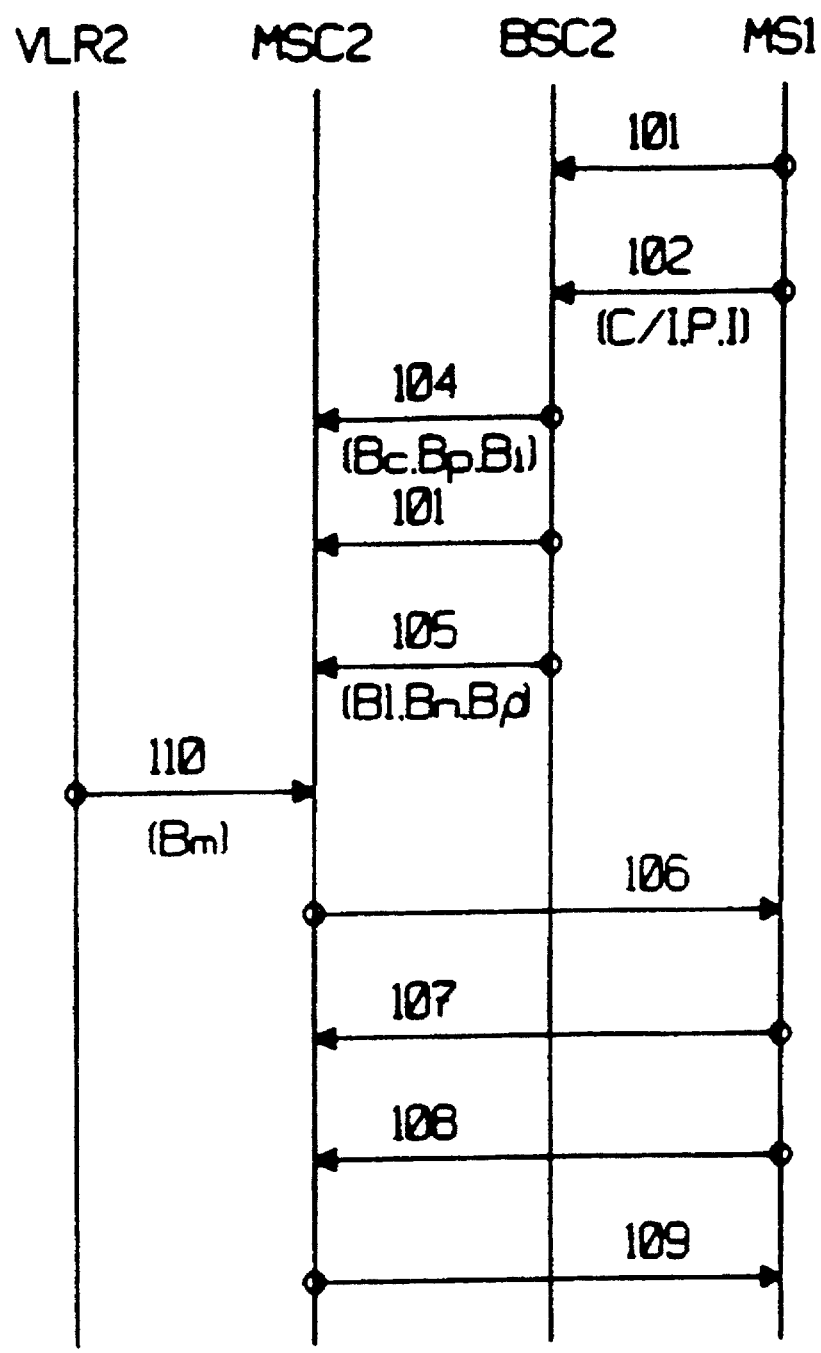
FIG. 13 is a diagram illustrating traffic situation events between a subscriber and a mobile station.

The manner in which the load values are calculated and used in a traffic situation in which a connection shall be set-up between the mobile station MS1 and the subscriber A will now be described with reference to FIG. 1a and FIG. 13. It has been assumed that the mobile station MS1 is activated in the mobile telephone system PLMN and information relating to the mobile station MS1 is found in a visitor location register VLR2. The mobile station sends to the base station controller BSC2, via the base station BS1, a signal 101 requesting for a common control channel CCCH. This channel request is a request for a speech channel, which may be one of the aforesaid channels K1, K2, K3 for which the load values are calculated. At the same time there is sent from the mobile station MS1 to the base station controller BSC2 on the control channel CCCH a signal 102 which contains data relating to such parameter values as the C/I-value, the interference I, the power P, etc. The base station controller BSC2 generates the load values in load generators in accordance with the parameter values and sends to the mobile services switching centre MSC2 a signal 104 which contains the generated load values Bc, Bi, Bp. The channel request signal 101 is also sent to the mobile services switching centre MSC2 in a similar way. Further parameter values stored in the base station controller BSC2, such as the number of transmitters/receivers ρ in use at the base stations BS1–BS3 and the attenuation L, generate the load values Bρ, B1 which are also transmitted to the mobile services switching centre MSC2 on a signal 105. The visitor location register VLR2 contains data relating to the performance of the mobile, i.e. the parameter m, which generates in a load generator a load value Bm, this value being sent to the mobile services switching centre MSC2 in a signal 110. The load values Bρ, B1 are combined in the mobile services switching centre MSC2 with the load values Bi, Bc, Bp and the load value Bm in the combining circuits S1, S2, S4, S5. The comparator KOMP3 compares the combined load values and chooses the combination of base station, speech channel and power state which will provide the connection between the mobile station MS1 and the subscriber A, via one of the base stations BS1–BS3, with the smallest load value. There is then effected a verification process in which the mobile telephone system checks that the mobile station MS1 has the authority to set-up a connection. This is explained in more detail in CME 20 Advanced System Technique, pp. 95–96, Doc. No. EN/LZT 120 264 R3A Ericsson Radio Systems AB, 1991. The communication for the verification process now continues on a dedicated control channel DCCH allocated to the mobile station MS1. If the mobile station MS1 is authorized, the mobile services switching centre MSC2 sends an access confirmation signal 106 to the mobile station MS1, via the dedicated control channel DCCH. The mobile station MS1 will then send to the mobile services switching centre MSC2 a connection request signal 107 together with the telephone number 108 of the subscriber A, via the dedicated control channel DCCH. The mobile telephone exchange receives the connection request signal 107 and sends to the mobile station MS1, via the base station controller BSC2 a signal 109 which contains information concerning the selected base station, the selected speech channel and the power state. The connection is then set-up on the dedicated control channel DCCH, by using the chosen combination of base station, speech channel and power state.

The load values may also be generated in the mobile station MS1 and the mobile services switching centre MSC2. The combination may alternatively be effected in the mobile station, the base station or the base controller. The aforegoing examples are simplified and it should be noted that the method of procedure can be modified within the scope of the inventive concept. It will also be noted that in the case of the exemplifying embodiments, the load values are calculated solely for the speech channel and not for the control channels DCCH and CCCH.

The actual signalling procedure is effected in accordance with signalling procedure No. 7 according to CCITT; c.f. the aforesaid reference CME 20 System Training Document.

Simulations have been carried out on a mobile telephone system to which the invention has been applied, with very good results. In comparison with a mobile telephone system that utilizes fixed frequency division, there is obtained a capacity increase of *100%*. Another advantage afforded by the invention is that the mobile stations consume less energy and that the batteries of the mobile stations therefore last longer. Furthermore, it is not necessary to employ frequency planning with a mobile telephone system that uses the present invention. This is evident from a report "Capacity Enhancements in a TDMA System" by Magnus Almgren, Håkan Andersson and Kenneth Wallstedt, Ericsson Radio Systems AB, April 1993, which is intended for publication. Examples of the load values that were used in the simulations are $Bp_{max}$=1000 according to FIG. *6e*, $Bc_{max}$=1800 according to FIG. *6d*, the value B4=200/dB according to the description of FIG. *6c*, so that the load value is 4000 on the axes C/Ined and C/Iup. It will also be seen that the load values Bh1, Bh2 and Bh3 according to FIG. 8 reach respectively to 300, 200 and 100.

These numerical values of the load values can be obtained by direct calculation of, for instance, signal strengths from the base station or the mobile station. Simulations were also used on a mobile telephone system according to the above, with the intention of obtaining adequate load values. Separate numerical values for $Bp_{max}$, B4 and other load values were used and the combination of numerical values that gave maximum use of the resources was chosen. One example of a criterion for resource utilization is to choose the load values that permit the most possible traffic. Full-scale tests can also be employed, by changing the numerical values of the load values in a radio system with ongoing traffic.

The invention can also be employed with radio communications systems having fixed radio stations, for instance a radio link system. It sometimes happens that a mobile telephone system is used as a fixed network when no public telephone network exists. In this case, the system will include base stations and mobile stations, although the mobile stations are stationarily installed with the subscribers.

In traditional mobile radio systems, the same base station is used for the uplink and the downlink of a connection. Systems which, in certain instances, use a base station for the uplink of a two-directional connection and another base station for the downlink of the same connection also occur. The invention can also be applied in cases such as these.

In traditional mobile radio systems, only one radio channel is used from a base station for the downlink. On the other hand, in the new CDMA standard, more than one radio channel from more than one base station is used for one single connection in certain instances, in order to obtain transmitter diversity in the downlink. The invention can also be applied with a mobile radio system which uses the CDMA-standard, and also with mobile radio systems which use single-directional connections where the same frequency is used for both the uplink and the downlink.

In traditional mobile radio systems, the base stations are stationary. However, a mobile radio system is conceivable in which a base station is movable. This applies, for instance, when needing to increase communication capacity temporarily on varying sites.

The load values that become successively more beneficial the lower the load value for a connection have been described in the aforegoing. It will be obvious, however, that it is possible to use within the scope of the invention other types of load values, for instance inverted values of the load values. This will result in a new type of load value, a quality factor, which becomes successively more advantageous the higher the value of the quality factor has for a connection.

It will be understood that the invention is not restricted to the aforedescribed and illustrated exemplifying embodiments thereof and that modifications can be made within the scope of the following claims.

We claim:

1. A method for setting-up a connection in a radio communication system which includes at least one first radio station having at least one transmitter/receiver, wherein the radio communication system has access to a plurality of channels for connections between at least one subscriber and at least one further radio station, and properties of the connections are contingent on parameters associated with the radio communication system including parameters not related to a radio connection, comprising the steps of:

selecting a first set of the parameters associated with the radio communication system;

estimating values of the parameters in the first set;

generating a first total load value for a connection with the first set in accordance with the estimated values;

selecting at least one alternative set of the parameters associated with the radio communication system;

estimating values of the parameters in an alternative set;

generating an alternative total load value for the connection with the alternative set in accordance with the estimated values;

comparing the first total load value with the alternative total load value for the connection;

selecting one of the first and alternative sets based on the comparison between the first and alternative total load values; and using the selected one of the sets for the connection.

2. The method of claim 1, wherein the step of generating the first total load value includes the steps of:

generating a load value corresponding to each of the parameters in the first set in accordance with the value of the respective parameter; and combining the load values.

3. The method of claim 2, wherein the load values are optimized during the combining step.

4. The method of claim 2, wherein the parameters in the first and alternative sets include parameters belonging to the plurality of channels, and the load values are combined by summation.

5. The method of claim 4, wherein the parameters belongings to the plurality of channels respectively include a ratio of channel signal strength and interfering signal strength (C/I), an interfering signal strength (I), and a transmitted power (P).

6. The method of claim 5, wherein the parameters in the first and alternative sets also include a performance parameter associated with a further radio station, and a load value corresponding to the performance parameter is combined with the load values corresponding to the parameters belonging to the channels by multiplication.

7. The method of claim 5, wherein the parameters in the first and alternative sets also include a change parameter representing a change in at least one of the first radio station, a channel, a power state of the further radio station, and a power state of the first radio station; a load value corresponding to the change parameter is generated upon a change; and the load value corresponding to the change parameter is combined by summation.

8. The method of claim 2, wherein the parameters in the first and alternative sets include parameters that are associated with a first radio station, and the load values are combined by summation.

9. The method of claim 8, wherein the parameters associated with the first radio station include attenuation (L) of a signal sent between the first radio station and the further radio station, a number of transmitters/receivers (N) available to the first radio station, and a number of transmitters/receivers (p) currently used by the first radio station.

10. The method of claim 9, wherein the parameters in the first and alternative sets also include parameters associated with a first radio station, and the load values corresponding to the parameters belonging to the channels and load values corresponding to the parameters associated with the first radio station are combined by summation.

11. The method of claim 10, wherein the parameters belonging to the plurality of channels include a ratio of channel signal strength and interfering signal strength (C/I), an interfering signal strength (I), and a transmitted power; and the parameters associated with the first radio station include attenuation (L) of a signal sent between the first radio station and the further radio station, a number of transmitters/receivers (N) available to the first radio station, and a number of transmitters/receiver (p) currently used by the first radio station.

12. The method of claim 10, wherein the first and alternative sets also include a performance parameter associated with the further radio station, and a load value corresponding to the performance parameter is combined by multiplication with the load values corresponding to the parameters belonging to the plurality of channel and to the parameters associated with the first radio station.

13. The method of claim 10, wherein the parameters in the first and alternative sets also include a change parameter representing a change in at least one of the first radio station, a channel, a power state of the further radio station, and a power state of the first radio station; a load value corresponding to the change parameter is generated upon a change; and the load value corresponding to the change parameter is combined by summation.

14. The method of claim 1, wherein the connections are two-directional, and first and alternative total values are generated for both directions of the connections.

15. A method of handing over a connection in a radio communications system which includes at least one first radio station having at least one transmitter/receiver, wherein the radio communications system has access to a plurality of channels for connections between at least one subscriber and at least one further radio station, and properties of the connections are contingent on parameters belonging to the radio communications system including parameters not related to a radio connection, comprising the steps of:

selecting a first set of the parameters belonging to an ongoing connection between a subscriber and a further radio station;

registering measured values of the parameters in the first set;

generating a first total load value for the ongoing connection with the first set in accordance with the registered values;

selecting at least one alternative set of the parameters belonging to an ongoing connection between a subscriber and a further radio station;

estimating values of the parameters in an alternative set;

generating an alternative total load value for the ongoing connection with the alternative set in accordance with the estimated values;

comparing the first total load value with the alternative total value for the ongoing connection;

selecting one of the first and alternative sets on the basis of the comparison between the first and alternative total load values; and using the selected one of the sets for the ongoing connection.

16. The method of claim 15, further comprising the steps of loading the ongoing connection via a first radio with the first total load value, and loading a connection between the subscriber and the further radio station via another first radio station with the alternative total load value, and handing over the ongoing connection between the subscriber and the further radio station to the other first radio station based on a difference between the first total load value and the alternative total load value.

17. The method of claim 16, wherein the ongoing connection is handed over when the difference between the first total load value and the alternative total load value exceeds a predetermined value.

18. The method of claim 15, wherein the radio communications system comprises a mobile telecommunications system, the first radio stations are radio base stations, and the further radio stations are mobile stations; and the method comprises the further steps of:

loading the ongoing connection via a first radio base station with the first total load value;

loading a connection between the subscriber and the mobile station via another of the radio base stations with the alternative total load value; and handing over the ongoing connection between the subscriber and the mobile station to the other radio base station when the first total load value has a value which is less beneficial than the alternative total load value.

19. The method of claim 18, wherein the ongoing connection is handed over when the difference between the first total load value and the alternative total load value exceeds a predetermined value.

20. The method of claim 15, wherein the radio communications system is a mobile telecommunications system, the first radio stations are radio base stations, and the further radio stations are mobile stations; and a first connection is set-up between a first subscriber and a first mobile station via a first base station on a first channel and is loaded with the first total load value; and the method comprises the further steps of:

setting-up a second connection between a second subscriber and a second mobile station via the first base station on a second channel, the second connection being loaded with a third total load value generated from a third set of parameters;

generating alternative total load values partly for the first connection between the first subscriber and the first mobile station on the second channel, and partly for the second connection between the second subscriber and the second mobile station on the first channel; and changing channels such that the first connection uses the second channel and the second connection uses the first channel when a sum of the first total load value and the third total value is less beneficial than a sum of the alternative total load values for the first and second connections.

21. A method for optimizing the use of channels in a radio communication system which includes at least one first radio station having at least one transmitter/receiver, wherein the radio communication system has access to channels for connections between at least one subscriber and at least one further radio station, and properties of the connections are contingent on parameters belonging to the radio communications system including parameters not related to a radio connection, comprising the steps of:

selecting a first set of the parameters belonging to the radio communication system;

registering measured values of the parameters in the selected first set;

generating a first total load value for a connection with the first set in accordance with the registered values;

selecting at least one alternative set of the parameters belonging to the radio communication system;

registering measured values of the parameters in an alternative set;

generating an alternative total load value for the connection with the alternative set in accordance with the registered values of the parameters in the alternative set;

comparing the first total load value with the alternative total load value for the connection;

selecting one of the first and alternative sets of parameters on the basis of the comparison between the first and alternative total load values; and using the selected one of the sets for the connection.

22. The method of claim 21, wherein the radio communication system is a mobile telecommunications system, the first radio stations are radio base stations, and the further radio stations are mobile stations; and a first connection is set-up between a first subscriber and a first mobile station via a first base station on a first channel and is loaded with the first total load value; and the method comprises the further steps of:

setting-up a second connection between a second subscriber and a second mobile station via a second radio base station, the second connection being loaded with a fourth total load value generated from a fourth set of parameters;

generating alternative total load values partly for the first connection between the first subscriber and the first mobile station via the second radio base station, and partly for the second connection between the second subscriber and the second mobile station via the first radio base station; and changing radio base stations such that the first connection uses the second radio base station and the second connection uses the first radio base station when a sum of the first total load value and the fourth total load value is less advantageous than a sum of the alternative total load values for the first and second connections.

23. The method of claim 21, wherein a first radio station has access to at least one subset of the plurality of the channels on which connections are set-up, the connections being set-up via the first radio station, and further comprising the step of selecting one of the first and alternative sets such that a sum of the total load values for connections which belong to the first radio station are optimally advantageous.

24. A method for setting-up a connection in a radio communication system which includes at least one first radio station having at least one transmitter/receiver, wherein the radio communication system has access to a plurality of channels for connections between at least one subscriber and at least one further radio station and properties of the connections are contingent on parameters associated with the radio communication system including parameters not related to a radio connection, comprising the steps of:

selecting a first set of the parameters associated with the radio communication system;

estimating values of the parameters in the selected first set;

generating a first total load value for a connection between a subscriber and a further radio station in accordance with the estimated values of the parameters in the first set;

comparing the first total load value for the connection with a predetermined threshold value; and using the first set of parameters for the connection when the first total load value is favorable based on the comparison with the predetermined threshold value.

25. The method of claim 24, wherein an increase in the first total load value results in a load increase on the radio communication system; and the first set of parameters is used when the predetermined threshold value is larger than the first total load value.

26. The method of claim 24, wherein a decrease in the first total load value results in a load increase on the radio communication system; and the first set of parameters is used when the threshold value is smaller than the first total load value.

27. The method of claim 24, further comprising the step of interrupting the connection when the comparison with the threshold value shows the first total load value is unfavorable.

28. A method of changing channels in a radio communication system which includes at least one first radio station having at least one transmitter/receiver, wherein the radio communication system has access to a plurality of channels for connections between at least one subscriber and at least one further radio station, and properties of the connections are contingent on parameters associated with the radio communication system including parameters not related to a radio connection, comprising the steps of:

selecting a first set of the parameters associated with the radio communication system;

recording measured values of the parameters in the selected first set;

generating a first total load value for a connection in accordance with the recorded values of the parameters in the selected first set;

comparing the first total load value for the connection with a first predetermined threshold value;

selecting at least one alternative set of the parameters associated with the radio communication system;

estimating values of the parameters in at least one of the selected alternative sets;

generating at least one alternative total load value for the connection in accordance with the estimated values of the parameters in a respective one of the alternative sets;

comparing at least one of the alternative total load values with a second predetermined threshold value; and using the respective alternative set of parameters for the connection when the comparisons with the first and second threshold values show the respective alternative total load value is favorable.

29. The method of claim 28, wherein an increase in the first and alternative total load values results in a load increase on the radio communication system; and an alternative set of parameters is used when the first threshold value is smaller than the first total load value and the second threshold value is larger than the respective alternative total load value.

30. The method of claim 28, wherein a decrease in the first and alternative load values results in a load increase on the radio communication system; and an alternative set of parameters is used when the first threshold value is larger than the first total load value and the second threshold value is smaller than the respective alternative total load value.

31. A method of setting-up a connection in a radio communication system which includes at least one first radio station having at least one transmitter/receiver, wherein the radio communication system has access to a plurality of channels for connections between at least one subscriber and at least one further radio station, properties of the connections are contingent on parameters associated with the radio communication system including parameters not related to a radio connection, and the channels are listed in an ordered sequence in a list which includes channels that have measured interference (I) values and established priorities and candidate channels that have no measured I values and no established priorities, comprising the steps of:

selecting a channel which has a first measured I value and a first established priority which is a function of the first I value;

generating a first total load value for the selected channel based on the first established priority;

selecting a candidate channel from the list;

measuring a second I value of the selected candidate channel and establishing a second priority of the selected candidate channel as a function of the second I value;

generating a second total load value for the selected candidate channel based on the second established priority;

comparing the first total load value with the second total load value; and exchanging positions in the list of the selected channel and the selected candidate channel when the comparison shows that the selected candidate channel is suitable.

32. The method of claim 31, wherein an increase in the first and second total load values results in a load increase on the radio communication system, and the positions of the selected channel and the selected candidate channel are exchanged when the first total load value is larger than the second total load value.

33. The method of claim 31, wherein a decrease in the first and second total load values results in a load increase on the radio communication system, and the positions of the selected channel and the selected candidate channel are exchanged when the first total load value is smaller than the second total load value.

34. A method for setting-up a connection in a radio communication system which includes at least one first radio station having at least one transmitter/receiver, wherein the radio communication system has access to a plurality of channels for connections between at least one subscriber and at least one further radio station, properties of the connections are contingent on parameters associated with the radio communication system including parameters not related to a radio connection, and the channels are listed according to their priority in a list which is updated on a regular basis, comprising the steps of:

selecting in the list a free channel that is not being used for a connection;

generating a load value for the connection in accordance with the priority of the selected free channel;

selecting a set of the parameters associated with the radio communication system;

recording measured values of the parameters in the selected set;

generating an alternative load value for the connection in accordance with the recorded values of the parameters in the selected set;

comparing the alternative load value for the connection with the load value; and using the selected free channel for the connection when the comparison shows that the alternative load value is favorable.

35. The method of claim 34, wherein an increase in the load values results in a load increase on the radio communication system, and the selected free channel is used when the load value is larger than the alternative load value.

36. The method of claim 34, wherein a decrease in the load values results in a load increase on the radio communication system, and the selected free channel is used when the load value is smaller than the alternative load value.

37. An arrangement for handling traffic resources in a radio communications system which includes at least one first radio station having at least one transmitter/receiver, wherein the radio communications system has access to a plurality of channels for connections via the first radio station between at least one subscriber and at least one further radio station, and properties of the connections are contingent on parameters associated with the radio communications system including parameters not related to a radio connection, comprising:

means for selecting a first set of the parameters associated with the radio communication system;

a first register for storing measured values of the parameters in the selected first set;

means for generating a first total load value for a connection with the first set of the parameters in accordance with the values stored in the first register;

means for selecting at least one alternative set of the parameters associated with the radio communication system;

a second register for storing measured values of the parameters in at least one selected alternative set;

means for generating at least one alternative total load value for the connection with a respective one of the alternative sets in accordance with the respective values stored in the second register; and means for comparing the first total load value with at least one alternative total load value for the connection and for selecting an advantageous one of the first and alternative sets of parameters based on the comparison;

wherein the radio communications system uses the selected advantageous one of the first and alternative sets for the connection.

38. The arrangement of claim 37, wherein the generating means generate a load value corresponding to each of the parameters in the sets of parameters; and the arrangement includes a combining circuit for combining the respective load values of the sets of parameters to generate the respective first and alternative total load values for the connection.

39. The arrangement of claim 38, further comprising means, in conjunction with the combining circuit, for optimizing the load values.

40. The arrangement of claim 38, wherein the combining circuit includes a summation circuit.

41. The arrangement of claim 38, wherein the combining circuit includes a multiplier.

42. The arrangement of claim 38, wherein the radio communications system is a mobile telephone system, the first radio stations are base stations, and the further radio stations are mobile stations; a first connection is set-up between a first subscriber and a first mobile station via a first base station, the first connection being loaded with the first total load value; a second connection is set-up between a second subscriber and a second mobile station via a second base station, the second connection being loaded with a fourth total load value generated from a fourth set of parameters; the arrangement generates the alternative total load values partly for the first connection via the second base station and partly for the second connection via the first base station; and the base stations change so that the first connection uses the second base station and the second connection uses the first base station when a sum of the first total load value and the fourth total load value is less advantageous than a sum of the alternative total load values.

43. The arrangement of claim 38, wherein the radio communications system is a mobile telephone system, the first radio stations are base stations, and the further radio stations are first mobile stations; the connection via a first base station is loaded with the first total load value and the connection via a second base station is loaded with an alternative total load value; and the connection switches from the first base station to the second base station when the first total load value has a less beneficial value than the alternative total load value.

44. The arrangement of claim 43, wherein the connection switches when the difference between the first total load value and the alternative total load value exceeds a predetermined value.

45. The arrangement of claim 37, wherein the connection is two-directional, and separate first and alternative total load values are generated for both directions of the connection.

46. The arrangement of claim 37, wherein a connection between the subscriber and the further radio station via the first radio station is loaded with the first total load value; the connection between the subscriber and the further radio station via another first radio station is loaded with an alternative total load value; and the connection switches from the first radio station to the other first radio station based on a difference between the first total load value and the alternative total load value.

47. The arrangement of claim 46, wherein the connection switches when the difference between the first total load value and the alternative total load value exceeds a predetermined value.

48. The arrangement of claim 37, wherein the radio communications system is a mobile telephone system, the first radio stations are base stations, and the further radio stations are mobile stations; a first connection is set-up between a first subscriber and a first mobile station via a first base station on a first channel and is loaded with the first total load value; a second connection is set-up between a second subscriber and a second mobile station via the first base station on a second channel and the second connection is loaded with a third total load value generated from a third set of parameters; the arrangement generates the alternative total load values partly for the first connection on the second channel and partly for the second connection on the first channel; and the channels change so that the first connection uses the second channel and the second connection uses the first channel when a sum of the first total load value and the third total load value is less advantageous than a sum of the alternative total load values.

49. The arrangement of claim 37, wherein the first radio station has access to at least one subset of the plurality of channels; connections are set-up via a first radio station on the channels in the subset; and the comparing and selecting means chooses one of the first and alternative sets such that a sum of total load values for connections set-up via the first radio station are optimally advantageous.

* * * * *